United States Patent
Xu et al.

(12) 
(10) Patent No.: US 12,096,222 B2
(45) Date of Patent: Sep. 17, 2024

(54) FAKE NETWORK DEVICE IDENTIFICATION METHOD AND COMMUNICATIONS APPARATUS

(71) Applicant: Huawei Technologies Co., Ltd., Guangdong (CN)

(72) Inventors: Bin Xu, Beijing (CN); Bingzhao Li, Beijing (CN); Lei Chen, Beijing (CN); Xuelong Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 17/315,049

(22) Filed: May 7, 2021

(65) Prior Publication Data
US 2021/0321260 A1 Oct. 14, 2021

Related U.S. Application Data
(63) Continuation of application No. PCT/CN2019/112336, filed on Oct. 21, 2019.

(30) Foreign Application Priority Data

Nov. 9, 2018 (CN) .......................... 201811333233.8

(51) Int. Cl.
H04W 12/122 (2021.01)
H04W 12/03 (2021.01)
(Continued)

(52) U.S. Cl.
CPC ......... *H04W 12/122* (2021.01); *H04W 12/03* (2021.01); *H04W 12/106* (2021.01); *H04W 74/0833* (2013.01)

(58) Field of Classification Search
CPC ... H04W 12/122; H04W 12/03; H04W 12/06; H04W 74/0833
(Continued)

(56) References Cited

U.S. PATENT DOCUMENTS

| 7,012,893 B2 * | 3/2006 | Bahadiroglu ......... H04L 69/161 |
| | | 370/231 |
| 7,042,854 B2 * | 5/2006 | Beidas .................. H04J 3/0611 |
| | | 370/510 |

(Continued)

FOREIGN PATENT DOCUMENTS

| CN | 102970671 A | 3/2013 |
| CN | 104837137 A | 8/2015 |

(Continued)

*Primary Examiner* — Venkat Perungavoor
*Assistant Examiner* — Peiliang Pan
(74) *Attorney, Agent, or Firm* — WOMBLE BOND DICKINSON (US) LLP

(57) ABSTRACT

This application provides a fake network device identification method and a communications apparatus. An uplink message sent by a terminal device is forwarded to a first network device via a second network device. After receiving the uplink message, the first network device generates a downlink message for the uplink message, performs security processing on the downlink message based on first time information, and/or sends the downlink message to the second network device. The second network device sends, to the terminal device, the downlink message on which the security processing is performed. The terminal device performs security verification on the received downlink message, and/or identifies whether the second network device is a fake network device. This helps improve communication security.

20 Claims, 8 Drawing Sheets

(51) Int. Cl.
  *H04W 12/106* (2021.01)
  *H04W 74/0833* (2024.01)
(58) Field of Classification Search
  USPC .......................................................... 726/26
  See application file for complete search history.

(56) References Cited

U.S. PATENT DOCUMENTS

| | | | | |
|---|---|---|---|---|
| 7,346,005 | B1* | 3/2008 | Dowdal | H04L 43/106 |
| | | | | 370/252 |
| 7,349,512 | B2* | 3/2008 | Rausch | H04J 3/0652 |
| | | | | 370/216 |
| 7,586,953 | B2* | 9/2009 | Forest | H03M 13/43 |
| | | | | 370/503 |
| 8,462,819 | B2* | 6/2013 | Bedrosian | H04J 3/0632 |
| | | | | 370/503 |
| 8,638,665 | B2* | 1/2014 | Takagi | H04L 49/109 |
| | | | | 370/235 |
| 9,628,994 | B1 | 4/2017 | Gunyel et al. | |
| 10,129,283 | B1* | 11/2018 | Briggs | H04W 12/126 |
| 10,735,576 | B1* | 8/2020 | Noonan | H04W 4/029 |
| 10,869,195 | B2* | 12/2020 | Bishop | H04W 12/06 |
| 11,153,083 | B2* | 10/2021 | Velev | H04L 63/068 |
| 11,297,072 | B2* | 4/2022 | Nakarmi | H04L 63/14 |
| 11,304,123 | B1* | 4/2022 | Noonan | H04W 48/16 |
| 11,431,837 | B1* | 8/2022 | Noonan | H04W 4/021 |
| 11,432,148 | B2* | 8/2022 | Liu | H04W 12/10 |
| 11,503,472 | B2* | 11/2022 | Miao | H04W 12/122 |
| 2013/0051234 | A1* | 2/2013 | Matsuoka | H04L 47/25 |
| | | | | 370/235 |
| 2017/0286675 | A1* | 10/2017 | Shin | H04L 63/1416 |
| 2017/0347249 | A1* | 11/2017 | Huang | H04W 4/14 |
| 2019/0349765 | A1* | 11/2019 | Kolekar | H04W 12/068 |
| 2020/0162925 | A1* | 5/2020 | Miao | H04W 12/108 |
| 2020/0187048 | A1* | 6/2020 | Mishra | H04L 47/6275 |
| 2020/0229206 | A1* | 7/2020 | Badic | H04W 40/22 |
| 2020/0322794 | A1* | 10/2020 | Baltatu | H04W 12/04 |
| 2021/0112444 | A1* | 4/2021 | Papa | H04W 28/0289 |
| 2021/0136585 | A1* | 5/2021 | Rosberg | H04W 24/08 |
| 2021/0168608 | A1* | 6/2021 | Liu | H04W 12/06 |
| 2021/0250769 | A1* | 8/2021 | Li | H04W 12/08 |
| 2021/0392498 | A1* | 12/2021 | Nakarmi | H04W 12/122 |
| 2021/0400547 | A1* | 12/2021 | Da Silva | H04W 76/10 |
| 2022/0070664 | A1* | 3/2022 | Stojanovski | H04W 60/00 |

FOREIGN PATENT DOCUMENTS

| | | | | |
|---|---|---|---|---|
| CN | 105657713 A | 6/2016 | | |
| CN | 105792194 A | 7/2016 | | |
| CN | 106028340 A | 10/2016 | | |
| CN | 106211169 A | 12/2016 | | |
| CN | 108012271 A | 5/2018 | | |
| WO | WO2017113063 A1 * | 7/2017 | ............ | H04W 74/00 |
| WO | 2018140204 A1 | 8/2018 | | |

\* cited by examiner

FAKE NETWORK DEVICE IDENTIFICATION METHOD AND COMMUNICATIONS APPARATUS

CROSS-REFERENCE TO RELATED APPLICATIONS

This application is a continuation of International Application No. PCT/CN2019/112336, filed on Oct. 21, 2019, which claims priority to Chinese Patent Application No. 201811333233.8, filed on Nov. 9, 2018. The disclosures of the aforementioned applications are hereby incorporated by reference in their entireties.

TECHNICAL FIELD

Embodiments of this application relate to the field of communications technologies, and in particular, to a fake network device identification method and a communications apparatus.

BACKGROUND

In a wireless communications technology, communication security is crucial. A fake base station attack may be a means of threatening communication security.

In a fake base station attack process, a fake base station is placed near a normal terminal device. Because the fake base station has better signal quality, the terminal device is attracted to camp on the fake base station. The fake base station transmits deception information and even viruses to the terminal device. Alternatively, the fake base station may intercept communication content between a normal base station and the terminal device, to monitor privacy data of a user. In addition, after camping on the fake base station, the terminal device may not be able to camp on a cell of the normal base station. Consequently, the normal base station may not be able to page the terminal device, and the terminal device may not be able to work normally. In a process in which the terminal device camps on the cell of the normal base station, the terminal device first may receive a synchronization signal of the cell, and perform downlink synchronization with the normal base station by using the synchronization signal. After the downlink synchronization is completed, the terminal device may receive a broadcast message, that is, the camping process is completed. In some embodiments, the terminal device may continuously detect signal quality of a neighboring cell; and after a cell reselection condition is met, the terminal device may perform a cell reselection process. If there is a fake base station near the terminal device, the fake base station may have relatively good signal quality, and the cell reselection condition of the terminal device is met, the terminal device may perform cell reselection and camps on the fake base station. Because the fake base station may receive a downlink message from the normal base station, the fake base station may forward the downlink message to the terminal device. In this case, the terminal device may not be able to distinguish whether the terminal device currently camps on the normal base station or the fake base station. Consequently, communication security may be threatened.

SUMMARY

Embodiments of this application provide a fake network device identification method and a communications apparatus, so that a terminal device can distinguish whether the terminal device currently camps on a normal base station or a fake base station. This helps ensure communication security.

In some embodiments (sometimes referred to as, "a first aspect"), the present disclosure provides a fake network device identification method. The method may be used for a terminal device, and/or may be used for a chip in a terminal device. The following describes the method by using an example in which the method is used for a terminal device. The method may include: A terminal device may send (e.g., transmit, provide, deliver) an uplink message to a second network device, where the uplink message may be sent by the second network device to a first network device; the terminal device receives (e.g., retrieves, obtains, acquires) a downlink message from the second network device, where the downlink message may be received by the second network device from the first network device, and/or the downlink message may be a message that is generated (e.g., produced, constructed, created) by the first network device based on the uplink message and on which security processing is performed based on first time information, where the security processing may include at least one of encryption or integrity protection, and the first time information may be time information determined (e.g., detected, sensed) by the first network device based on a time point at which the uplink message is received; and/or the terminal device performs (e.g., executes, implements) security verification on the downlink message, where the security verification may include at least one of decryption or integrity protection verification. In some embodiments, the uplink message sent by the terminal device is forwarded (e.g., transmitted, redirected, distributed) to the first network device via the second network device. After receiving the uplink message, the first network device generates the downlink message for the uplink message, performs the security processing on the downlink message based on the first time information, and/or sends the downlink message to the second network device. The second network device sends, to the terminal device, the downlink message on which the security processing is performed. The terminal device performs the security verification on the received downlink message, and/or identifies (e.g., determines, assesses) whether the second network device is a fake network device. This helps to improve communication security.

In some embodiments, that the terminal device performs the security verification on the downlink message is to perform the security verification on the downlink message based on second time information, where the second time information is time information determined by the terminal device based on a time point at which the uplink message is sent; and/or when the security verification performed by the terminal device on the downlink message fails, the terminal device determines that the second network device is a fake network device. According to this solution, the terminal device deduces (e.g., determines), based on the time point at which the uplink message is sent, a time point at which the first network device receives the uplink message, to obtain (e.g., gather, collect, retrieve) the second time information; performs, based on the second time information, the security verification on the downlink message on which the first network device performs the security processing based on the first time information; and/or determines, based on whether the verification performed on the downlink message succeeds, whether the second network device that sends the downlink message is a fake network device. This may help to identify the fake network device and/or ensure the communication security.

In some embodiments, after receiving the downlink message from the second network device, the terminal device performs the security verification on the downlink message based on second time information, where the second time information is time information determined by the terminal device based on a time point at which the uplink message is sent; records (e.g., copies, logs, documents) a quantity n of times that verification performed on a downlink message fails; determines whether the quantity n of times exceeds a preset quantity m of times; and/or if the quantity n of times exceeds the preset quantity m of times, determines that the second network device is a fake network device, where m≥1 and m is an integer, and/or n≥1 and n is an integer. According to this solution, the terminal device determines, based on the quantity of times that verification performed on a downlink message fails, whether there is a second network device involved or whether the second network is a fake network, to avoid misjudgment performed by the terminal device.

In some embodiments, when the first network device performs security processing on the downlink message by using a first key, the terminal device performs security verification on the downlink message by using a second key. According to this solution, the first network device performs the security processing on the downlink message by using the first key, to prevent a fake network device from performing security verification on the downlink message by deducing the second time information and tampering with the downlink message after the verification succeeds. This may help to ensure the communication security.

In some embodiments, the uplink message includes a message 1 in a random access procedure, and the downlink message includes a message 2 in the random access procedure. According to this solution, the MSG1 and the MSG2 in the random access procedure are used to identify a fake network device.

In some embodiments, before sending the uplink message to the second network device, the terminal device receives a broadcast message from the first network device, where the broadcast message is a message on which the first network device performs security processing, and the broadcast message includes at least one of random access channel (random access channel, RACH) resource configuration information or a system frame number SFN. According to this solution, the terminal device may obtain the RACH resource configuration information and the like in a broadcast message phase for random access.

In some embodiments, that a terminal device sends an uplink message to a second network device includes: The terminal device determines a first RACH resource based on the RACH resource configuration information, where the RACH resource configuration information indicates the first RACH resource, and the first RACH resource is used by the terminal device to send the uplink message; and the terminal device sends the message 1 to the second network device on the first RACH resource. According to this solution, when the RACH resource configuration information indicates the first RACH resource and a second RACH resource, the terminal device may flexibly choose to send the MSG1 on the first RACH resource or the second RACH resource, to avoid a disadvantage that when the terminal device does not need to perform random access, the terminal device still needs to initiate the random access to identify whether there is a second network device involved.

In some embodiments, the uplink message includes a message 3 in a random access procedure, and/or the downlink message includes a message 4 in the random access procedure. In some embodiments, the MSG3 and/or the MSG4 in the random access procedure are used to identify whether the second network device is a fake network device.

In some embodiments (sometimes referred to as, "a second aspect"), the present disclosure, an embodiment of this application provides a fake network device identification method. In some embodiments, the method may be used for a first network device, and/or may be used for a chip in a first network device. The following describes the method by using an example in which the method is used for a first network device. In some embodiments, the method includes: A first network device receives an uplink message from a second network device, where the uplink message is sent by a terminal device to the second network device; and the first network device sends a downlink message to the second network device, where the downlink message is to be sent by the second network device to the terminal device, the downlink message is generated by the first network device for the uplink message, and the first network device performs security processing on the downlink message based on first time information, where the security processing includes at least one of encryption or integrity protection, and the first time information is time information determined by the first network device based on a time point at which the uplink message is received. In some embodiments, the uplink message sent by the terminal device is forwarded to the first network device via the second network device. In some embodiments, after receiving the uplink message, the first network device generates the downlink message for the uplink message, performs the security processing on the downlink message based on the first time information, and/or sends the downlink message to the second network device. In some embodiments, the second network device sends, to the terminal device, the downlink message on which the security processing is performed. In some embodiments, the terminal device performs security verification on the received downlink message, and identifies whether the second network device is a fake network device. This may help to improve communication security.

In some embodiments, before sending, to the second network device, the downlink message on which the security processing is performed, the first network device performs security processing on the downlink message by using a first key. In some embodiments—the first network device performs the security processing on the downlink message by using the first key, to prevent a fake network device from performing security verification on the downlink message by deducing second time information and tampering with the downlink message after the verification succeeds. This may help to ensure the communication security.

In some embodiments, the uplink message includes a message 1 in a random access procedure, and/or the downlink message includes a message 2 in the random access procedure. In some embodiments—the MSG1 and/or the MSG2 in the random access procedure are used to identify a fake network device.

In some embodiments, before receiving the uplink message from the second network device, the first network device sends, to the terminal device, a broadcast message on which security processing is performed, where the broadcast message on which the security processing is performed includes at least one of random access channel RACH resource configuration information or a system frame number SFN. According to this solution, the first network device configures the RACH resource and the like for the terminal device.

In some embodiments, that the first network device receives the uplink message from the second network device is to receive the message 1 from the second network device on a first RACH resource, where the message 2 does not carry an uplink grant, the RACH resource configuration information indicates the first RACH resource, and/or the first RACH resource is a resource used by the terminal device to send the uplink message. In some embodiments—when the RACH resource configuration information indicates the first RACH resource and/or a second RACH resource, the terminal device may flexibly choose to send the MSG1 on the first RACH resource or the second RACH resource, to avoid a disadvantage that when the terminal device does not need to perform random access, the terminal device still needs to initiate the random access to identify whether there is a second network device involved.

In some embodiments, the uplink message includes a message 3 in a random access procedure, and/or the downlink message includes a message 4 in the random access procedure. In some embodiments—the MSG3 and/or the MSG4 in the random access procedure are used to identify whether the second network device is a fake network device.

In some embodiments (sometimes referred to as, "a third aspect"), the present disclosure provides a fake network device identification method. In some embodiments, the method may be used for a terminal device, or may be used for a chip in a terminal device. In some embodiments, the following describes the method by using an example in which the method is used for a terminal device. In some embodiments, the method includes: A terminal device receives a downlink message from a second network device, where the downlink message is sent by a first network device to the second network device, the downlink message carries indication information, and/or the indication information is used to indicate valid duration of the downlink message to the terminal device; and/or the terminal device determines, based on the indication information, whether the second network device is a fake network device. In some embodiments—when sending the downlink message to the terminal device, the first network device adds the indication information to the downlink message, to indicate the valid duration of the downlink message to the terminal device, so that the terminal device determines, based on the valid duration, whether there is a second network device involved. This may help to ensure communication security.

In some embodiments, when the terminal device determines, based on the indication information, whether the second network device is a fake network device, the terminal device determines, based on the indication information, whether the downlink message is valid; and/or if the downlink message is valid, the terminal device determines that the second network device is not a fake network device. In some embodiments—when sending the downlink message to the terminal device, the first network device adds, to the downlink message, the indication information indicating the valid duration of the downlink message, so that the terminal device determines, based on the valid duration, whether the received downlink message is valid, and therefore identifies whether the second network device is a fake network device. This may help to ensure the communication security.

In some embodiments, when the terminal device determines, based on the indication information, whether the second network device is a fake network device, the terminal device determines, based on the indication information, whether the downlink message is valid; records a quantity n of times of receiving an invalid downlink message; determines whether the quantity n of times exceeds a preset quantity m of times; and/or if the quantity n of times exceeds the preset quantity m of times, determines that the second network device is a fake network device, where $m \geq 1$ and m is an integer, and $n \geq 1$ and n is an integer. In some embodiments—the terminal device determines, based on the quantity of times of receiving an invalid downlink message, whether there is a second network device involved, to avoid misjudgment performed by the terminal device.

In some embodiments, the downlink message includes a broadcast message; and/or that the terminal device receives the downlink message from the second network device is to receive, from the second network device, the broadcast message on which security processing is performed, where the first network device performs the security processing on the broadcast message and/or sends the broadcast message to the second network device; or the terminal device receives the broadcast message from the second network device, where the broadcast message includes indication information on which security processing is performed, and/or the first network device performs the security processing on the indication information in the broadcast message. In some embodiments—the first network device adds the indication information to the broadcast message, so that after receiving the indication information, the terminal device may determine, based on the indication information, whether there is a network device currently involved. This may help to identify a fake network device in a broadcast message phase.

In some embodiments (sometimes referred to as, "a fourth aspect"), the present disclosure provides a fake network device identification method. In some embodiments, the method may be used for a first network device, or may be used for a chip in a first network device. In some embodiments, the following describes the method by using an example in which the method is used for a first network device. In some embodiments, the method includes: A first network device adds indication information in a downlink message, where the indication information is used to indicate valid duration of the downlink message to a terminal device; and/or the first network device sends the downlink message to a second network device, where the downlink message is to be sent by the second network device to the terminal device. In some embodiments—when sending the downlink message to the terminal device, the first network device adds the indication information to the downlink message, to indicate the valid duration of the downlink message to the terminal device, so that the terminal device determines, based on the valid duration, whether there is a second network device involved. This may help to ensure communication security.

In some embodiments, the downlink message includes a broadcast message; and/or when sending the downlink message to the second network device, the first network device performs security processing on the broadcast message and/or sends, to the second network device, the broadcast message on which the security processing is performed; or the first network device performs security processing on indication information and/or sends, to the second network device, the broadcast message including the indication information on which the security processing is performed.

In some embodiments (sometimes referred to as, "a fifth aspect"), the present disclosure provides a communications apparatus. In some embodiments, the apparatus may be a terminal device, or may be a chip in a terminal device. In some embodiments, the apparatus may include a processing unit, a sending unit, and a receiving unit. In some embodiments, when the apparatus is a terminal device, the processing unit may be a processor, the sending unit may be a transmitter, and the receiving unit may be a receiver. In some embodiments, the terminal device may include a storage unit, and the storage unit may be a memory. In some embodiments, the storage unit is configured to store an instruction, and the processing unit executes the instruction stored in the storage unit, so that the terminal device is enabled to implement a function in the first aspect or any one of the possible implementations of the first aspect. In some embodiments, when the apparatus is a chip in a terminal device, the processing unit may be a processor, the sending unit or the receiving unit may be a transceiver unit, and the transceiver unit may be an input/output interface, a pin, a circuit, or the like. In some embodiments, the processing unit executes an instruction stored in a storage unit, so that the terminal device is enabled to implement a function in the first aspect or any one of the possible implementations of the first aspect. In some embodiments, the storage unit may be a storage unit (for example, a register or a cache) in the chip, or may be a storage unit (for example, a read-only memory or a random-access memory) that is located outside the chip and that is in the terminal device.

In some embodiments (sometimes referred to as, "a sixth aspect"), the present disclosure provides a communications apparatus. In some embodiments, the apparatus may be a first network device, or may be a chip in a first network device. In some embodiments, the apparatus may include a processing unit, a sending unit, and a receiving unit. In some embodiments, when the apparatus is a first network device, the processing unit may be a processor, the sending unit may be a transmitter, and the receiving unit may be a receiver. In some embodiments, the first network device may include a storage unit, and the storage unit may be a memory. In some embodiments, the storage unit is configured to store an instruction, and the processing unit executes the instruction stored in the storage unit, so that the first network device is enabled to implement a function in the second aspect or any one of the possible implementations of the second aspect. In some embodiments, when the apparatus is a chip in a first network device, the processing unit may be a processor, and the transceiver unit may be an input/output interface, a pin, a circuit, or the like. In some embodiments, the processing unit executes an instruction stored in a storage unit, so that the first network device is enabled to implement a function in the second aspect or the possible implementations of the second aspect. In some embodiments, the storage unit may be a storage unit (for example, a register or a cache) in the chip, or may be a storage unit (for example, a read-only memory or a random-access memory) that is located outside the chip and that is in the first network device.

In some embodiments (sometimes referred to as, "a seventh aspect"), the present disclosure provides a communications apparatus. The apparatus may be a terminal device, or may be a chip in a terminal device. In some embodiments, the apparatus may include a processing unit, a sending unit, and a receiving unit. In some embodiments, when the apparatus is a terminal device, the processing unit may be a processor, the sending unit may be a transmitter, and the receiving unit may be a receiver. In some embodiments, the terminal device may include a storage unit, and the storage unit may be a memory. In some embodiments, the storage unit is configured to store an instruction, and the processing unit executes the instruction stored in the storage unit, so that the terminal device is enabled to implement a function in the third aspect or any one of the possible implementations of the third aspect. In some embodiments, when the apparatus is a chip in a terminal device, the processing unit may be a processor, and the transceiver unit may be an input/output interface, a pin, a circuit, or the like. In some embodiments, the processing unit executes an instruction stored in a storage unit, so that the terminal device is enabled to implement a function in the third aspect or any one of the possible implementations of the third aspect. In some embodiments, the storage unit may be a storage unit (for example, a register or a cache) in the chip, or may be a storage unit (for example, a read-only memory or a random-access memory) that is located outside the chip and that is in the terminal device.

In some embodiments (sometimes referred to as, "an eighth aspect"), the present disclosure provides a communications apparatus. In some embodiments, the apparatus may be a first network device, or may be a chip in a first network device. In some embodiments, the apparatus may include a processing unit, a sending unit, and a receiving unit. In some embodiments, when the apparatus is a first network device, the processing unit may be a processor, the sending unit may be a transmitter, and the receiving unit may be a receiver. In some embodiments, the first network device may include a storage unit, and the storage unit may be a memory. In some embodiments, the storage unit is configured to store an instruction, and the processing unit executes the instruction stored in the storage unit, so that the first network device is enabled to implement a function in the fourth aspect or any one of the possible implementations of the fourth aspect. In some embodiments, when the apparatus is a chip in a first network device, the processing unit may be a processor, and the transceiver unit may be an input/output interface, a pin, a circuit, or the like. In some embodiments, the processing unit executes an instruction stored in a storage unit, so that the first network device is enabled to implement a function in the fourth aspect or any one of the possible implementations of the fourth aspect. In some embodiments, the storage unit may be a storage unit (for example, a register or a cache) in the chip, or may be a storage unit (for example, a read-only memory or a random-access memory) that is located outside the chip and that is in the first network device.

In some embodiments (sometimes referred to as, "a ninth aspect), the present disclosure provides a computer program product including an instruction. In some embodiments, when the computer program product runs on a computer, the computer is enabled to perform the method according to the first aspect or any one of the possible implementations of the first aspect.

In some embodiments (sometimes referred to as, "a tenth aspect"), the present disclosure provides a computer program product including an instruction. In some embodiments, when the computer program product runs on a computer, the computer is enabled to perform the method according to the second aspect or any one of the possible implementations of the second aspect.

In some embodiments (sometimes referred to as, "an eleventh aspect"), the present disclosure provides a computer program product including an instruction. In some embodiments, when the computer program product runs on a computer, the computer is enabled to perform the method according to the third aspect or any one of the possible implementations of the third aspect.

In some embodiments (sometimes referred to as, "an twelfth aspect"), the present disclosure provides a computer program product including an instruction. In some embodiments, when the computer program product runs on a computer, the computer is enabled to perform the method according to the fourth aspect or any one of the possible implementations of the fourth aspect.

In some embodiments (sometimes referred to as, "an thirteenth aspect"), the present disclosure provides a computer-readable storage medium. In some embodiments, the computer-readable storage medium stores instructions, and when the instructions are run on a computer, the computer is enabled to perform the method according to the first aspect or any one of the possible implementations of the first aspect.

In some embodiments (sometimes referred to as, "an fourteenth aspect"), the present disclosure provides a computer-readable storage medium. In some embodiments, the computer-readable storage medium stores instructions, and when the instructions are run on a computer, the computer is enabled to perform the method according to the second aspect or any one of the possible implementations of the second aspect.

In some embodiments (sometimes referred to as, "an fifteenth aspect"), the present disclosure provides a computer-readable storage medium. In some embodiments, the computer-readable storage medium stores instructions, and when the instructions are run on a computer, the computer is enabled to perform the method according to the third aspect or any one of the possible implementations of the third aspect.

In some embodiments (sometimes referred to as, "an sixteenth aspect"), the present disclosure provides a computer-readable storage medium. In some embodiments, the computer-readable storage medium stores instructions, and when the instructions are run on a computer, the computer is enabled to perform the method according to the fourth aspect or any one of the possible implementations of the fourth aspect.

The embodiments of this application may provide the fake network device identification method and the communications apparatus. In some embodiments, the uplink message sent by the terminal device is forwarded to the first network device via the second network device. In some embodiments, after receiving the uplink message, the first network device generates the downlink message for the uplink message, performs the security processing on the downlink message based on the first time information, and sends the downlink message to the second network device. In some embodiments, the second network device sends, to the terminal device, the downlink message on which the security processing is performed. In some embodiments, the terminal device performs the security verification on the received downlink message, and identifies whether the second network device is a fake network device. This may help to improve the communication security.

DETAILED DESCRIPTION OF EMBODIMENTS

Figure 1A:
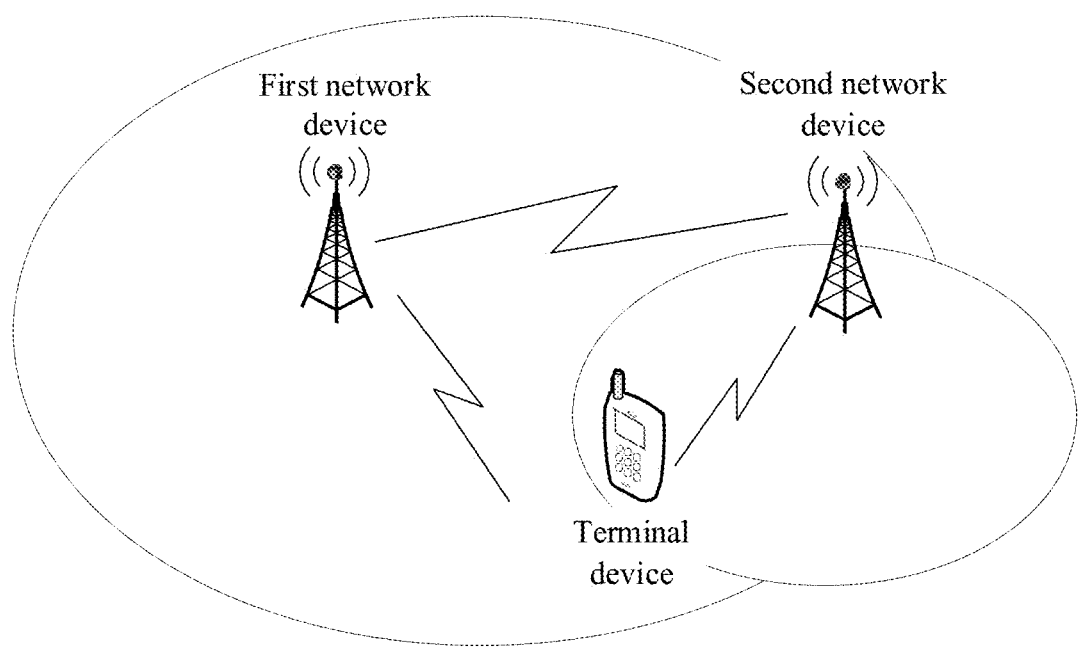
FIG. 1A is a schematic diagram of an example scenario to which a fake network device identification method is applicable according to an embodiment of this application.

A process in which a terminal device accesses a cell of a normal base station may include a synchronization phase, a broadcast message phase, and a random access phase. In an initial access process, if there is a fake base station with better signal quality near the terminal device in the broadcast message phase or the random access phase, the terminal device may access the fake base station. In an initial access process, if there is no fake base station with better signal quality near the terminal device, the terminal device may access the normal base station. After the terminal device accesses the normal base station, due to factors such as movement of the terminal device, if there is a fake base station with better signal quality near the terminal device, the terminal device may performs cell reselection and/or access the fake base station. After accessing the fake base station, when the terminal device receives a downlink message, because the fake base station may receive the downlink message from the normal base station, the fake base station may forward the downlink message to the terminal device. In this case, the terminal device may not be able to distinguish whether the terminal device currently camps on the normal base station or the fake base station. Consequently, communication security may be threatened.

In view of this, embodiments of this application provide a fake network device identification method and a communications apparatus, to help identify whether a terminal device currently camps on a normal network device or a fake network device.

The fake network device identification method provided in the embodiments of this application may be applied to a 4th generation (4th generation, 4G) mobile communications system (for example, a long term evolution (long term evolution, LTE) system, an advanced long term evolution (advanced long term evolution, LTE-A) system), a cellular system related to the 3rd generation partnership project (3rd generation partnership project, 3GPP), a 5th generation (5th generation, 5G) mobile communications system, and a subsequent evolved communications system. 5G may also be referred to as new radio (new radio, NR).

A first network device or a second network device in the embodiments of this application may be a base station such as a macro base station, a micro base station, or a distributed unit-control unit (distributed unit-control unit, DU-CU), and is a device that is deployed in a radio access network and that can perform wireless communication with a terminal device. The base station may be configured to mutually convert a received over-the-air frame and an internet protocol (internet protocol, IP) packet and serve as a router between the terminal device and a remaining part of an access network, where the remaining part of the access network may include an IP network. The base station may coordinate attribute management of an air interface. For example, the base station may be an evolved NodeB (evolved NodeB, eNB or e-NodeB) in LTE, or may be a gNB in NR. The base station may, in some embodiments, be a radio controller in a cloud radio access network (cloud radio access network, CRAN) scenario, or may be a relay station, an access point, a vehicle-mounted device, a wearable device, a network device in a future evolved public land mobile network (public land mobile network, PLMN), or the like. This is not limited in the embodiments of this application.

A terminal device in the embodiments of this application may be a device that provides a user with voice and/or data connectivity, a handheld device with a wireless connection function, or another processing device connected to a wireless modem. The terminal device may communicate with one or more core networks through a radio access network (radio access network, RAN). The terminal device may be a mobile terminal device, such as a mobile phone (also referred to as a "cellular" phone) or a computer with a mobile terminal device, for example, may be a portable, pocket-sized, handheld, computer built-in, or in-vehicle mobile apparatus. They exchange a voice and/or data with the radio access network. For example, the terminal device may be a personal communications service (personal communications service, PCS) phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal in a future 5G network, or a terminal device in a future evolved public land mobile network (public land mobile network, PLMN). This is not limited in the embodiments of this application. The terminal device may also be referred to as a system, a subscriber unit (subscriber unit), a subscriber station (subscriber station), a mobile station (mobile station), a mobile (mobile), a remote station (remote station), an access point (access point), a remote terminal device (remote terminal), an access terminal device (access terminal), a user terminal device (user terminal), a user agent (user agent), a user device (user device), or user equipment (user equipment).

FIG. 1A is a schematic diagram of an example scenario to which a fake network device identification method is applicable according to an embodiment of this application. Referring to FIG. 1A, a terminal device is located in a cell of a first network device and/or a cell of a second network device. The first network device may be a normal network device, and the second network device may be a fake network device. When the second network device has better signal quality, the terminal device may access the second network device, causing a threat to communication security. To avoid the threat, when sending a downlink message to the terminal device, the first network device may perform security processing on the downlink message, and/or send, to the terminal device, the downlink message on which the security processing is performed. After receiving the downlink message on which the security processing is performed, the terminal device may determine whether there is a second network device involved.

Figure 1B:
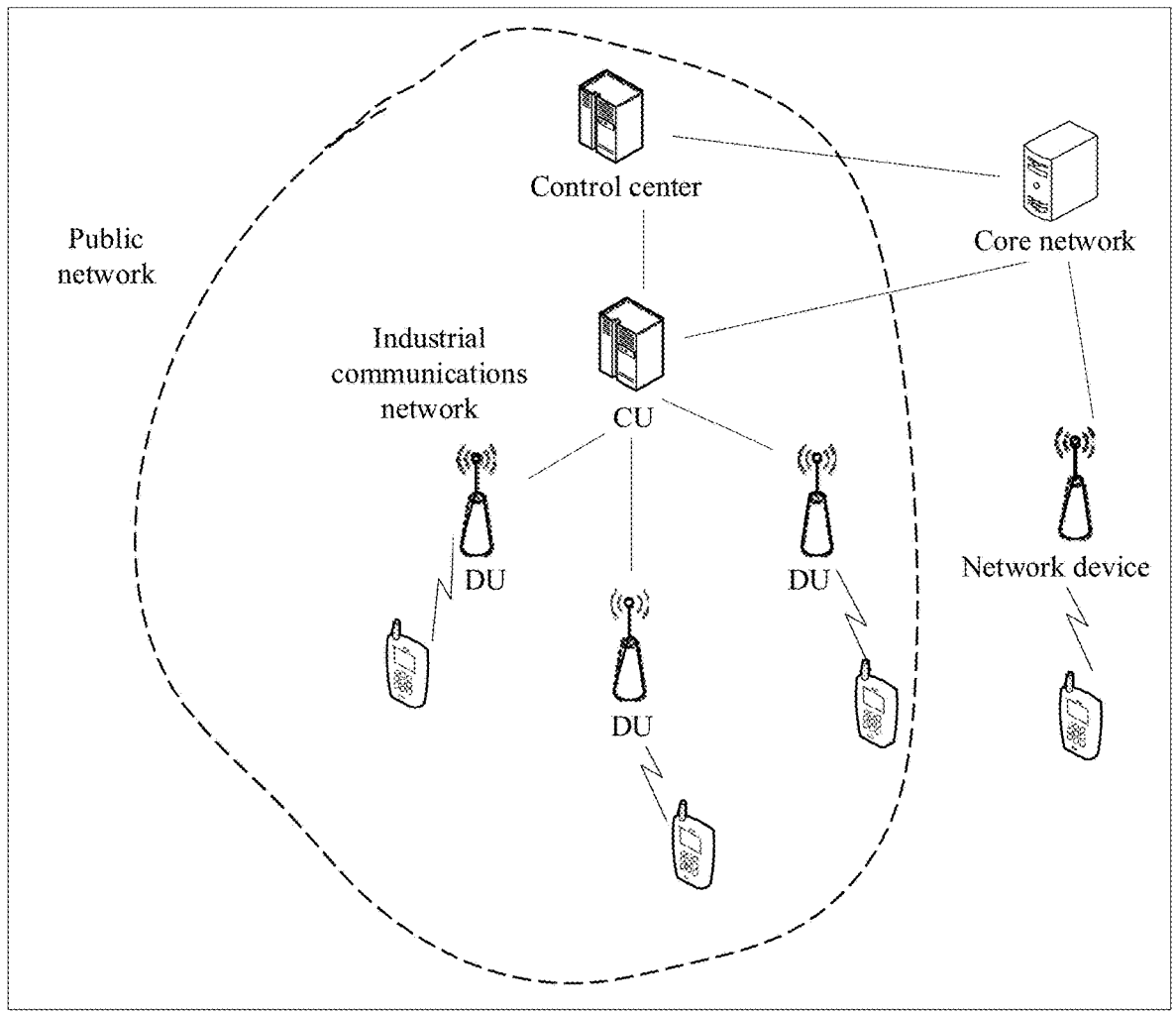
FIG. 1B is a schematic diagram of an example scenario to which a fake network device identification method is applicable according to an embodiment of this application.

FIG. 1B is a schematic diagram of an example scenario to which a fake network device identification method is applicable according to an embodiment of this application. Referring to FIG. 1B, a public network can provide both an industrial communications service and a public network communications service. When the public network is used for industrial communication, factory components, including servers of various departments and mobile phones of personnel of various departments, are connected to a control center via a distributed unit-control unit (distributed unit-control unit, DU-CU), or factory components may be connected to a control center via a network device. During public network communication, a terminal device may directly communicate with a core network of a public network via a DU-CU architecture or a network device. The network device may be a transit node for implementing communication between the terminal device and the core network, a CU is responsible for centralized control, and a DU is responsible for radio frequency transmission communication. The control center serves as a server or a control center node in an industrial communication scenario, and/or is responsible for delivering a control command to the factory component, processing an uplink message of the terminal device, and the like. When there is a fake DU-CU or a fake network device with better signal quality near the factory component, the factory component may access the fake DU-CU or the fake network device. This may cause a threat to communication security. To avoid the threat, when sending a downlink message to the factory component, a normal DU-CU or a normal network device may perform security processing on the downlink message, and send, to the factory component, the downlink message on which the security processing is performed. After receiving the downlink message on which the security processing is performed, the factory component may determine whether there is a fake DU-CU or a fake network device involved.

The following describes the fake network device identification method in the embodiments of this application in detail by using an example of the scenario shown in FIG. 1A. For example, refer to FIG. 2.

Figure 2:
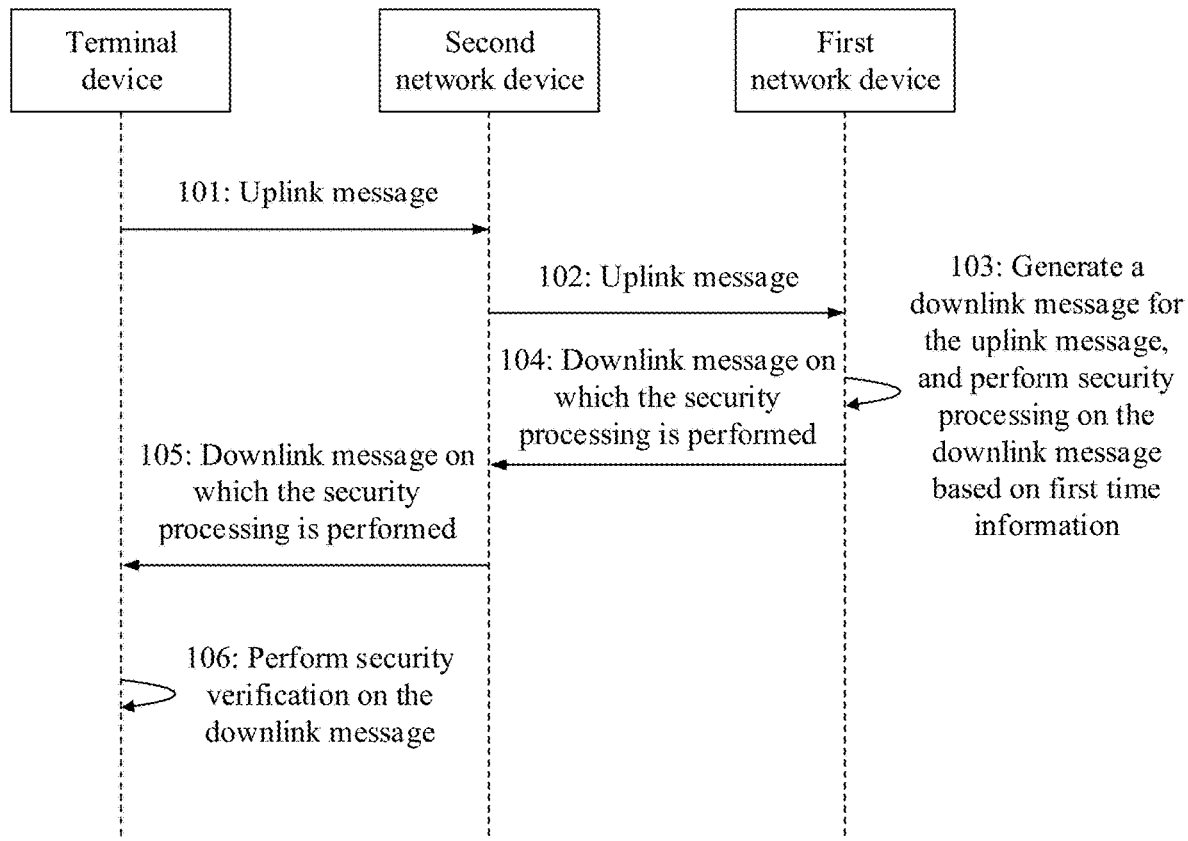
FIG. 2 is a flowchart of an example fake network device identification method according to an embodiment of this application.

FIG. 2 is a flowchart of an example fake network device identification method according to an embodiment of this application. In this embodiment, the fake network device identification method in this application is described from a perspective of interaction between a first network device and a terminal. This embodiment includes the following operations.

101: The terminal device sends an uplink message to a second network device.

In this embodiment of this application, when the terminal device does not perform cell reselection or cell handover to the second network device, when the terminal device sends the uplink message, the uplink message may be directly sent from the terminal device to the first network device; when the terminal device performs cell reselection or cell handover and accesses the second network device, the uplink message of the terminal device may be sent to the second network device, and/or forwarded by the second network device to the first network device. For the terminal device, in some embodiments, the terminal device does not know whether the uplink message is directly sent to the first network device or is forwarded by the second network device to the first network device. In other words, in some embodiments, the terminal device does not know whether the second network device is a fake network device. If fake network device identification is not performed, when the terminal device camps on the fake network device, the terminal device may not know whether the uplink message and/or a downlink message are forwarded by the fake network device.

In this operation, in a scenario in which there is a second network device, it is assumed that a cell reselection condition or a cell handover condition is met. In this case, in a process in which the terminal device performs cell reselection or handover to the second network device, the terminal device may initiate a random access procedure or another communication procedure. In the communication procedure, the terminal device may sends the uplink message to the second network device. In some embodiments, the second network device receives the uplink message.

102: The second network device may sends the uplink message to the first network device.

In this operation, the second network device may forwards the uplink message to the first network device. In some embodiments, the first network device may receive the uplink message forwarded by the second network device.

103: The first network device may generate a downlink message for the uplink message, and/or perform security processing on the downlink message based on first time information.

The first time information is time information determined by the first network device based on a time point at which the uplink message is received, and/or the security processing includes at least one of encryption or integrity protection.

In this operation, after receiving the uplink message, the first network device may generate the downlink message for the received uplink message, and/or perform the security processing on the downlink message based on the first time information, to obtain the downlink message on which the security processing is performed. For example, if the uplink message is a message 1 (MSG1) in a random access procedure, the first network device may respond with a downlink message message 2 (MSG2) based on the MSG1, and/or perform security processing on the MSG2, to obtain the MSG2 on which the security processing is performed; if the uplink message is a message 3 (MSG3) in a random access procedure, the first network device may respond with a downlink message message 4 (MSG4) based on the MSG3, and/or perform security processing on the MSG4, to obtain the MSG4 on which the security processing is performed; if the uplink message is a message including data and the like, the first network device may generate a response message based on the uplink message, and/or perform security processing on the response message, to obtain the response message on which the security processing is performed, where the response message includes an acknowledgement (acknowledgement, ACK) message or a negative acknowledgement (negative acknowledgement, NACK) message.

The security processing may include at least one of encryption or integrity protection. In some embodiments, encryption means that the first network device processes an original downlink message based on an encryption algorithm, an encryption parameter, and the like. In an encryption process, an operation may need to be performed on the downlink message based on the encryption parameter and/or the encryption algorithm, to obtain the encrypted downlink message. After receiving the encrypted downlink message, if a receive end performs an inverse operation based on the same algorithm and/or parameter, the original downlink message, that is, the unencrypted downlink message may be obtained. On the contrary, if the receive end does not know the encryption algorithm and the encryption parameter, the receive end may not be able to correctly read the original downlink message. The receive end is, for example, the terminal device or the second network device.

In some embodiments, integrity protection means that an operation is performed on an encrypted downlink message or an unencrypted downlink message based on an integrity protection parameter and/or an integrity protection algorithm, to obtain an operation result A (for example, a character string), and/or the operation result is added after the to-be-transmitted downlink message and/or transmitted together with the to-be-transmitted downlink message. After receiving the downlink message carrying the operation result A, a receive end may use the same algorithm and/or parameter to perform an operation on the downlink message carrying the operation result A, to obtain an operation result B. If the two operation results A and B are consistent, it may indicate that integrity protection verification on the downlink message succeeds. If the downlink message is invalidly modified in a transmission process, causing inconsistency between A and B, it may indicate that integrity protection verification on the downlink message fails.

It should be noted that, in this embodiment of this application, the security processing may include only an encryption process or an integrity protection process, or may include both an encryption process and an integrity protection process. In some embodiments, a security processing process is: The first network device first performs encryption processing on the downlink message, and performs integrity protection processing on the encrypted downlink message. After receiving the downlink message on which security processing is performed, the receive end first performs integrity protection verification, and/or then decrypts the downlink message on which the integrity protection verification is performed.

In this embodiment of this application, the first time information is determined by the first network device based on the time point at which the uplink message is received. The first time information may be an absolute time, or may be a relative time, or may be a time that has a fixed offset from the absolute time or the relative time. For example, the first time information may be determined by the first network device based on the time point at which the uplink message is received, or may be a time deduced based on the time point at which the uplink message is received and/or a preset rule. For example, the time point at which the first network device receives the uplink message is t1, and the security processing may be performed on the downlink message based on t1, or the security processing may be performed on the downlink message based on $t=t1+t2$, where t2 is a preset time value, and $t=t1+t2$ is a preset rule.

104: The first network device may send, to the second network device, the downlink message on which the security processing is performed.

In some embodiments, the second network device may receive the downlink message that is sent by the first network device and on which the security processing is performed.

105: The second network device may send, to the terminal device, the downlink message on which the security processing is performed.

In some embodiments, the terminal device receives the downlink message that is forwarded by the second network device and on which the security processing is performed.

106: The terminal device may perform security verification on the downlink message.

The security verification may include at least one of decryption or integrity protection verification.

In this operation, the terminal device performs at least one of decryption or integrity protection verification on the received downlink message, to determine whether the second network device is a fake network device. For example, after receiving the downlink message on which the security processing is performed, the terminal device performs integrity protection verification, and/or decrypts the downlink message on which the integrity protection verification is performed.

This embodiment of this application provides the fake network device identification method. The uplink message sent by the terminal device may be forwarded to the first network device via the second network device. After receiving the uplink message, the first network device may generate the downlink message for the uplink message, perform the security processing on the downlink message based on the first time information, and/or send the downlink message to the second network device. The second network device may send, to the terminal device, the downlink message on which the security processing is performed. The terminal device may perform the security verification on the received downlink message, and/or identify whether the second network device is a fake network device. This may help to improve the communication security.

The following describes in detail how the terminal device performs the security verification on the downlink message to determine whether the second network device is an involved fake network device in the foregoing embodiment.

In some embodiments, when the terminal device performs the security verification on the downlink message, the terminal device may perform the security verification on the downlink message based on second time information, where the second time information is time information determined by the terminal device based on a time point at which the uplink message is sent or a time point at which the downlink message is received. The second time information and the first time information may be the same time, or may have a fixed time difference. When the security verification performed by the terminal device on the downlink message fails, the terminal device may determine that the second network device is a fake network device.

For example, after receiving the downlink message on which the security processing is performed, the terminal device may perform the security verification on the downlink message based on the second time information. In a scenario in which there is no second network device, the uplink message may be directly sent from the terminal device to the first network device. Similarly, the downlink message on which the security processing is performed is directly sent from the first network device to the terminal device. In this case, the security verification performed by the terminal device on the received downlink message based on the determined second time information succeeds, and it indicates that the downlink message is sent by the normal first network device to the terminal device. In a scenario in which there is a second network device, the security verification performed by the terminal device on the downlink message based on the determined second time information fails, and it indicates that the downlink message is forwarded by a fake network device, that is, the second network device, to the terminal device. A reason why the verification fails may be that an extra delay is introduced due to forwarding or processing of the second network device. Consequently, in some embodiments, the second time information determined by the terminal device does not match the first time information determined by the first network device, and the verification fails. The second time information may be an absolute time or a relative time at which the terminal device sends the uplink message, or may be a time that has a fixed offset from the absolute time or the relative time. For example, the second time information may be determined by the terminal device based on the time point at which the uplink message is sent, or may be a time deduced based on the time point at which the uplink message is sent and/or a preset rule. For example, the time point at which the terminal device sends the uplink message is t3, and the security verification may be performed on the downlink message based on t3, or the security verification may be performed on the downlink message based on t5=t3+t4, where t4 is a preset time value, and t5=t3+t4 is a preset rule. When the terminal device camps on the first network device, the terminal device may learn that t3 may be the same as t1, or there is a fixed time difference t6 between t3 and t1. In some embodiments, when the terminal device camps on the second network device, the terminal device cannot learn that there is a fixed time difference t6 between t3 and t1.

Figure 3:
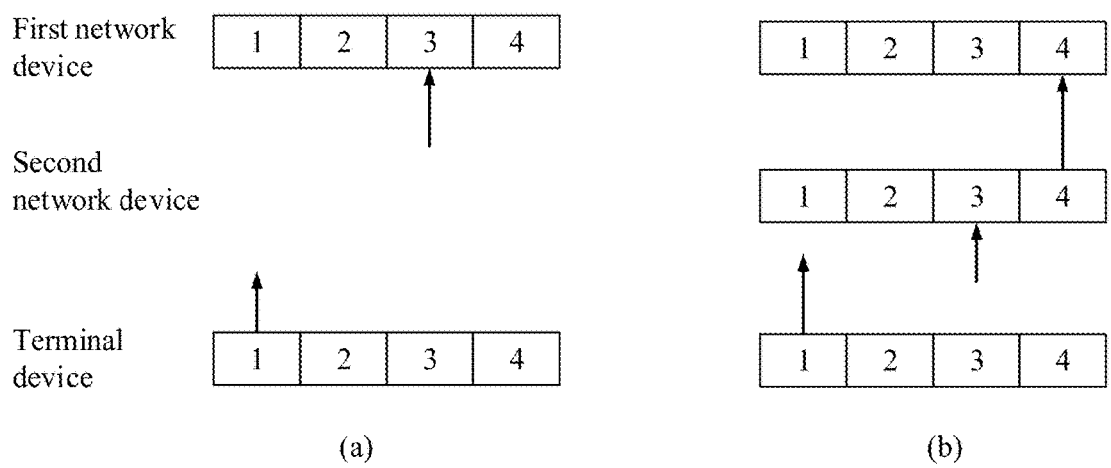
FIG. 3 is a schematic diagram of an example security verification process in a fake network device identification method according to an embodiment of this application.

FIG. 3 is a schematic diagram of an example security verification process in a fake network device identification method according to an embodiment of this application.

Referring to (a) in FIG. 3, when there is no fake network device, namely, a second network device, near a terminal device, the terminal device may send an uplink message to a first network device in a frame 1, and the first network device receives the uplink message in a frame 3. In some embodiments, the terminal device deduces, based on a time point at which the uplink message is sent in the frame 1, a time at which the first network device receives the uplink message, and obtains second time information based on the deduced time, where the second time information is, for example, related to the frame 3. In some embodiments, the first network device determines first time information based on a time point at which the uplink message is received in the frame 3. In some embodiments, the first time information is related to the frame 3. In some embodiments, because both the first time information and the second time information are related to the frame 3, after the first network device performs security processing on a downlink message based on the first time information and/or sends the downlink message to the terminal device, security verification performed by the terminal device on the received downlink message based on the second time information succeeds. In this case, it may be considered that there is no second network device involved.

Referring to (b) in FIG. 3, when there is a second network device with relatively good signal quality near a terminal device, the terminal device may send an uplink message to a first network device in a frame 1, and/or the second network device intercepts the uplink message in a frame 3 and/or forwards the uplink message. In some embodiments, the first network device receives, in a frame 4, the uplink message forwarded by the second network device. In some embodiments, the terminal device deduces, based on a time point at which the uplink message is sent in the frame 1, a time at which the first network device receives the uplink message, and obtains second time information based on the deduced time, where the second time information is, for example, related to the frame 3. In some embodiments, the first network device determines first time information based on a time point at which the uplink message is received in the frame 4, where the first time information is, for example, related to the frame 4. In some embodiments, because the first time information is related to the frame 4 and the second time information is related to the frame 3, after the first network device performs security processing on a downlink message based on the first time information and/or sends the downlink message to the terminal device, security verification performed by the terminal device on the received downlink message based on the second time information fails. In this case, the terminal device may determine that the second network device is a fake network device.

In this embodiment, the terminal device deduces, based on the time point at which the uplink message is sent, a time point at which the first network device receives the uplink message, to obtain the second time information; performs, based on the second time information, the security verification on the downlink message on which the first network device performs the security processing based on the first time information; and determines, based on whether the verification performed on the downlink message succeeds, whether the second network device that sends the downlink message is a fake network device. This may help identify the fake network device and/or ensure communication security.

In some embodiments, after the terminal device receives the downlink message from the first network device, the method includes:

In some embodiments, the terminal device performs the security verification on the downlink message based on second time information, where the second time information is time information determined by the terminal device based on a time point at which the uplink message is sent; the terminal device records a quantity n of times that verification performed on a downlink message fails; the terminal device determines whether the quantity n of times exceeds a preset quantity m of times; and/or if the quantity n of times exceeds the preset quantity m of times, the terminal device determines that the second network device is a fake network device, where m≥1 and m is an integer, and n≥1 and n is an integer. The quantity n of times may be a quantity of consecutive times of failed verification, or may be an accumulated quantity of nonconsecutive times of failed verification.

For example, after the terminal device receives the downlink message on which the security processing is performed, if the verification performed by the terminal device on the downlink message fails, the failed verification may be caused by a reason that the uplink message and/or the downlink message are forwarded by the second network device, or may be caused by another reason. For example, if there are an excessively large quantity of terminal devices, the first network device cannot process uplink messages sent by the plurality of terminal devices in time. Consequently, verification performed by the terminal device on a downlink message fails. In some embodiments, if verification performed by the terminal device on a downlink message on which security processing is performed fails for the first time, and the terminal device determines that the second network device that sends the downlink message is a fake network device, misjudgment may occur. In some embodiments, to avoid misjudgment, after receiving a downlink message on which security processing is performed, if verification performed by the terminal device on the downlink message fails, the terminal device records that the verification performed on the downlink message fails. In some embodiments, after receiving for a plurality of times, a downlink message on which security processing is performed, the terminal device records an accumulated quantity n of times that verification performed on a downlink message fails. In some embodiments, whether the quantity n of times exceeds the preset quantity m of times is compared. In some embodiments, if the quantity n of times exceeds the preset quantity m of times, it is considered that the second network device is a fake network device. In some embodiments, if the quantity n of times does not exceed the preset quantity m of times, an uplink message is resent and the foregoing verification process is repeated after a corresponding downlink message is received; and if verification performed on the downlink message still fails, the quantity n of times that verification performed on a downlink message fails is updated to n+1. In some embodiments, whether the quantity n+1 of times exceeds the preset quantity m of times is compared. If the quantity n+1 of times exceeds the preset quantity m of times, it is considered that the second network device is a fake network device.

The example shown in (b) in FIG. 3 continues to be used. In some embodiments, after receiving the downlink message on which the security processing is performed, if the verification performed by the terminal device on the downlink message based on the second time information fails, the terminal device records that the verification on the downlink message fails at this time. In some embodiments, after receiving for a plurality of times, a downlink message on which security processing is performed, the terminal device records an accumulated quantity n of times that verification performed on a downlink message based on the second time information fails. In some embodiments, whether the quantity n of times exceeds the preset quantity m of times is determined. In some embodiments, if the quantity n of times does not exceed the preset quantity m of times, an uplink message is resent, so that the first network device continues to generate a downlink message for the uplink message, performs security processing on the downlink message, and/or sends the downlink message. In some embodiments, after receiving the downlink message, the terminal device repeats the foregoing verification process, and if verification performed on the downlink message still fails, the quantity of times that verification performed on a downlink message fails is updated to n+1. In some embodiments, whether the quantity n+1 of times exceeds the preset quantity m of times is compared. In some embodiments, if the quantity n+1 of times exceeds the preset quantity m of times, it is considered that the second network device is a fake network device.

In this embodiment, the terminal device determines, based on the quantity of times that verification performed on a downlink message fails, whether there is a second network device involved, to avoid misjudgment performed by the terminal device.

In this embodiment of this application, to prevent a fake network device from performing security verification on the downlink message by deducing the second time information and tampering with the downlink message after the verification succeeds, in addition to performing the security processing on the downlink message based on the first time information, the first network device performs security processing on the downlink message by using a first key. In some embodiments, the terminal device performs security verification on the downlink message by using a second key. The following describes in detail how the first network device may perform the security processing on the downlink message by using the first key to prevent the message from being tampered with by the second network device.

For example, after generating the downlink message for the received uplink message, the first network device performs the security processing on the downlink message by using the first key before, after, or at the same time when performing the security processing on the downlink message based on the first time information. In some embodiments, the first network device sends, to the terminal device, the downlink message on which the security processing is performed by using the first key and/or the first time information. In some embodiments, the first key is a key that can be learned of by the first network device and the terminal device, but the second network device cannot learn of the first key. In some embodiments, if there is a second network device near the terminal device, after the second network device intercepts the downlink message, even if the second network device deduces the second time information, because the second network device cannot learn of the second key corresponding to the first key, verification performed by the second network device on the downlink message fails, and therefore the second network device cannot tamper with the downlink message. In some embodiments, after receiving the downlink message, the terminal device performs security verification on the downlink message based on the second key corresponding to the first key and/or the second time information. The first key and the second key may be the same key. The first key and the second key may be pre-allocated keys, or keys derived based on pre-allocated keys.

In this embodiment, the first network device performs the security processing on the downlink message by using the first key, to prevent a fake network device from performing security verification on the downlink message by deducing the second time information and tampering with the downlink message after the verification succeeds. This may help to ensure the communication security.

The following describes in detail the fake network device identification method by using two embodiments. For example, refer to FIG. 4 and FIG. 5.

Figure 4:
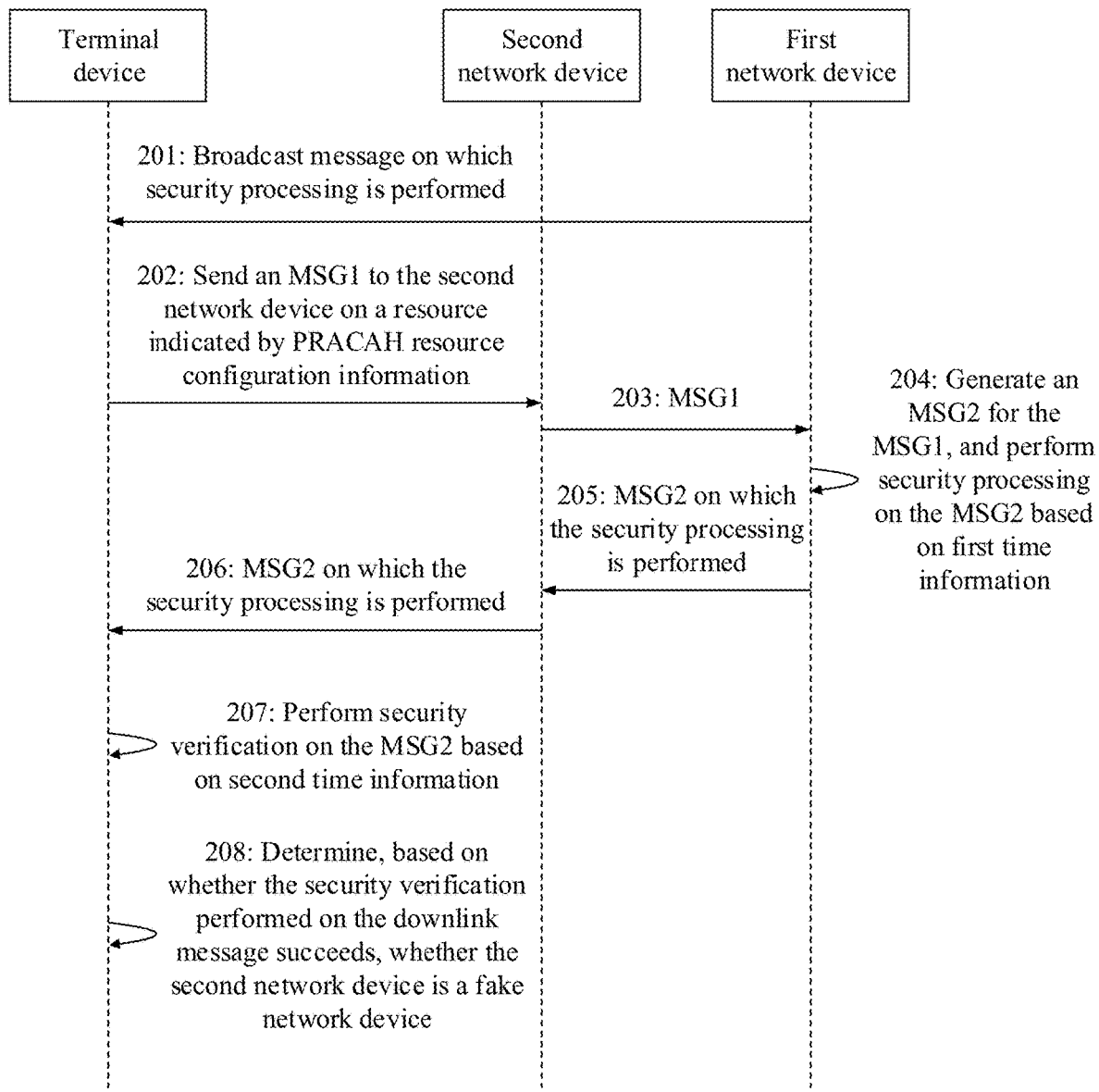
FIG. 4 is a flowchart of an example fake network device identification method according to an embodiment of this application.

FIG. 4 is a flowchart of an example fake network device identification method according to an embodiment of this application. In this embodiment, an uplink message includes a message 1 in a random access procedure, and a downlink message includes a message 2 in the random access procedure. The message 1 is, for example, a message (message, MSG) 1, and the message 2 is, for example, an MSG2. In this embodiment, a fake network device is identified by using the MSG1 and/or the MSG2 in the random access procedure. This embodiment includes the following operations.

201: A first network device may send, to a terminal device, a broadcast message on which security processing is performed.

In this embodiment of this application, a process in which the terminal device accesses the first network device includes a signal synchronization phase, a broadcast message phase, and a random access phase.

In this operation, the first network device may perform security processing on the broadcast message, and/or send, to the terminal device in the broadcast message phase, the broadcast message on which the security processing is performed. In some embodiments, the terminal device receives the broadcast message on which the security processing is performed. In some embodiments, the broadcast message on which the security processing is performed includes random access channel RACH resource configuration information and/or a system frame number (system frame number, SFN).

In some embodiments, to distinguish whether a purpose of sending an MSG1 by the terminal device is to perform random access or identity whether there is a second network device involved, in this operation, the RACH resource configuration information sent by the first network device to the terminal device indicates a first RACH resource and/or a second RACH resource. In some embodiments, if the terminal device sends an MSG1 on the first RACH resource, it indicates that a purpose of sending the MSG1 by the terminal device is to identify whether there is a second network device involved. If the terminal device sends the MSG1 on the second RACH resource, it indicates that a purpose of sending the MSG1 by the terminal device is mainly to perform random access.

202: The terminal device may send the MSG1 to a second network device on a resource indicated by PRACH resource configuration information.

In some embodiments, the second network device receives the MSG1.

It should be noted that for the terminal device, in some embodiments, the terminal device does not know whether the MSG1 is intercepted by the second network device.

In some embodiments, it should be noted that in a scenario in which there is no fake network device, that is, the second network device, in this operation, the terminal device directly sends the MSG1 to the first network device on the resource indicated by the RACH resource configuration information.

203: The second network device may send the MSG1 to the first network device.

In some embodiments, the first network device receives the MSG1, and/or determines first time information based on a time point at which the MSG1 is received.

In this operation, in some embodiments, if the RACH resource configuration information indicates the first RACH resource and/or the second RACH resource, the terminal device needs to first determine whether the MSG1 is sent for a purpose of performing random access or identifying whether there is a second network device involved. In some embodiments, if the terminal device is merely intended to identify whether there is a second network device involved, the terminal device sends the MSG1 to the first network device on the first RACH resource. In some embodiments, if the terminal device is intended to perform normal random access, the terminal device sends the MSG1 to the first network device on the second RACH resource.

204: The first network device may generate an MSG2 for the MSG1, and/or perform security processing on the MSG2 based on the first time information.

In some embodiments, when the MSG2 needs to be prevented from being tampered with by the second network device, the first network device may perform security processing on the MSG2 by using a first key. The first key is, for example, a public key.

In some embodiments, if the first network device determines that the MSG1 is sent by the terminal device on the first RACH resource, the first network device generates, for the MSG1, an MSG2 that does not carry an uplink grant (UL grant), and subsequently does not receive an MSG3. In some embodiments, if the first network device determines that the MSG1 is sent by the terminal device on the second RACH resource, the first network device generates, for the MSG1, an MSG2 carrying an uplink grant, and subsequently continues to receive an MSG3.

205: The first network device may send, to the second network device, the MSG2 on which the security processing is performed.

206: The second network device may send, to the terminal device, the MSG2 on which the security processing is performed.

In some embodiments, the terminal device receives the MSG2 on which the security processing is performed.

207: The terminal device may perform security verification on the MSG2 based on second time information.

In the foregoing operation 204, when the first network device performs the security processing on the MSG2 by using the first key, in this operation for some embodiments, the terminal device needs to perform security verification on the MSG2 by using a second key. The second key is, for example, a private key of the terminal device, and the private key corresponds to the public key in operation 204.

208: The terminal device may determine, based on whether the security verification performed on the downlink message succeeds, whether the second network device is a fake network device.

In this embodiment, when the RACH resource configuration information indicates the first RACH resource and the second RACH resource, the terminal device may flexibly choose to send the MSG1 on the first RACH resource or the second RACH resource, to avoid a disadvantage that when the terminal device does not need to perform random access, the terminal device still needs to initiate the random access to identify whether there is a second network device involved.

Figure 5:
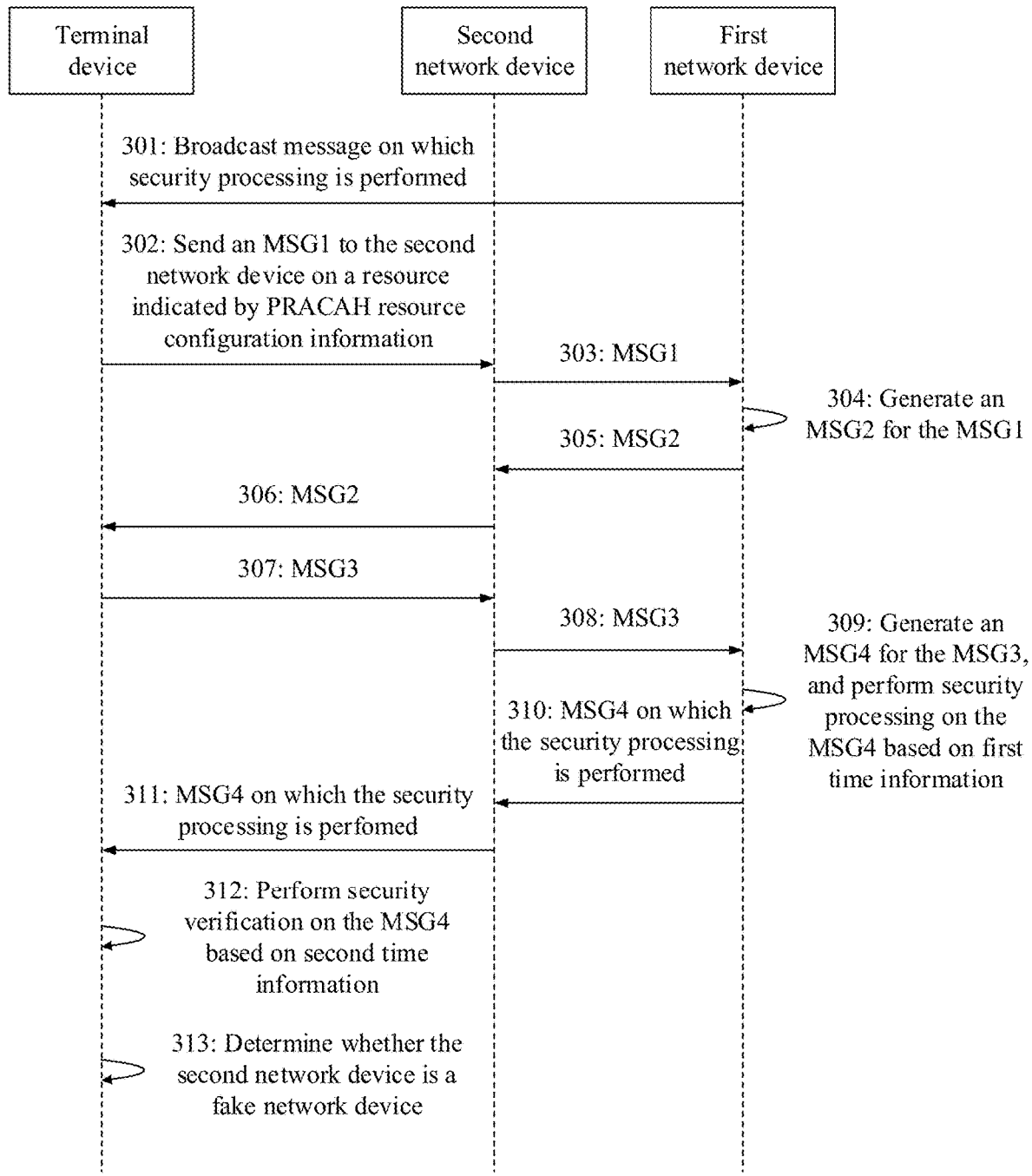
FIG. 5 is a flowchart of an example fake network device identification method according to an embodiment of this application.

FIG. 5 is a flowchart of an example fake network device identification method according to an embodiment of this application. In this embodiment, an uplink message includes a message 3 in a random access procedure, and a downlink message includes a message 4 in the random access procedure. In this embodiment, whether a second network device is a fake network device is identified by using the MSG3 and/or the MSG4 in the random access procedure. This embodiment includes the following operations.

301: A first network device may send, to a terminal device, a broadcast message on which security processing is performed.

In this operation for some embodiments, the first network device performs security processing on the broadcast message, and/or sends, to the terminal device in a broadcast message phase, the broadcast message on which the security processing is performed. In some embodiments, the terminal device receives the broadcast message on which the security processing is performed. In some embodiments, the broadcast message on which the security processing is performed includes random access channel RACH resource configuration information and/or a system frame number (system frame number, SFN).

302: The terminal device may send an MSG1 to a second network device on a resource indicated by PRACH resource configuration information.

In some embodiments, the second network device receives the MSG1.

303: The second network device may send the MSG1 to the first network device.

In some embodiments, the first network device receives the MSG1.

304: The first network device may generate an MSG2 for the MSG1.

305: The first network device may send the MSG2 to the second network device.

In some embodiments, the second network device receives the MSG2.

306: The second network device may send the MSG2 to the terminal device.

In some embodiments, the terminal device may receive the MSG2.

307: The terminal device sends an MSG3 to the second network device.

308: The second network device may send the MSG3 to the first network device.

In some embodiments, the first network device may receive the MSG3, and determines first time information based on a time point at which the MSG3 is received. The terminal device may determine second time information based on a time point at which the MSG3 is sent.

In some embodiments, the network device may determine an identity of the terminal device based on the MSG3, and determine a private key of the terminal device based on the identity.

309: The first network device may generate an MSG4 for the MSG3, and/or perform security processing on the MSG4 based on the first time information.

In some embodiments, when the MSG4 needs to be prevented from being tampered with by the second network device, the first network device may perform security processing on the MSG4 by using a first key. The first key is, for example, the private key determined in the foregoing operation 305.

310: The first network device may sends, to the second network device, the MSG4 on which the security processing is performed.

311: The second network device may send, to the terminal device, the MSG4 on which the security processing is performed.

In some embodiments, the terminal device may receive the MSG4 on which the security processing is performed.

312: The terminal device may perform security verification on the MSG4 based on the second time information.

In the foregoing operation 309, when the first network device performs the security processing on the MSG4 by using the private key, in this operation for some embodiments, the terminal device needs to perform security verification on the MSG4 by using the private key.

314: The terminal device may determine whether the second network device is a fake network device.

In this embodiment, the first network device may determine the identity of the terminal device based on the MSG3 and/or determines the private key, and/or performs the security processing on the MSG4 based on the first time information and/or the private key, so that only the terminal device that stores the private key can perform the security verification on the MSG4. This may help to ensure communication security.

It should be noted that, in the foregoing embodiment, the terminal device may need to keep synchronous with the first network device. In consideration of clock drift, the terminal device needs to maintain a timer. In some embodiments, each time when the timer expires, the terminal device initiates random access to synchronize with a clock in the first network device or a clock in a core network.

In the foregoing embodiment, after receiving an uplink message, the first network device may generate a downlink message for the uplink message, and/or perform security processing on the downlink message and/or send the downlink message to the terminal device, so that the terminal device determines, based on whether the verification performed on the downlink message on which the security processing is performed succeeds, whether the second network device is a fake network device. However, each time before sending a downlink message, the first network device does not need to receive an uplink message. The following describes in detail how the terminal device determines, when the downlink message sent by the network device is unrelated to uplink message receiving, whether there is a second network device involved. For example, refer to FIG. 6.

Figure 6:
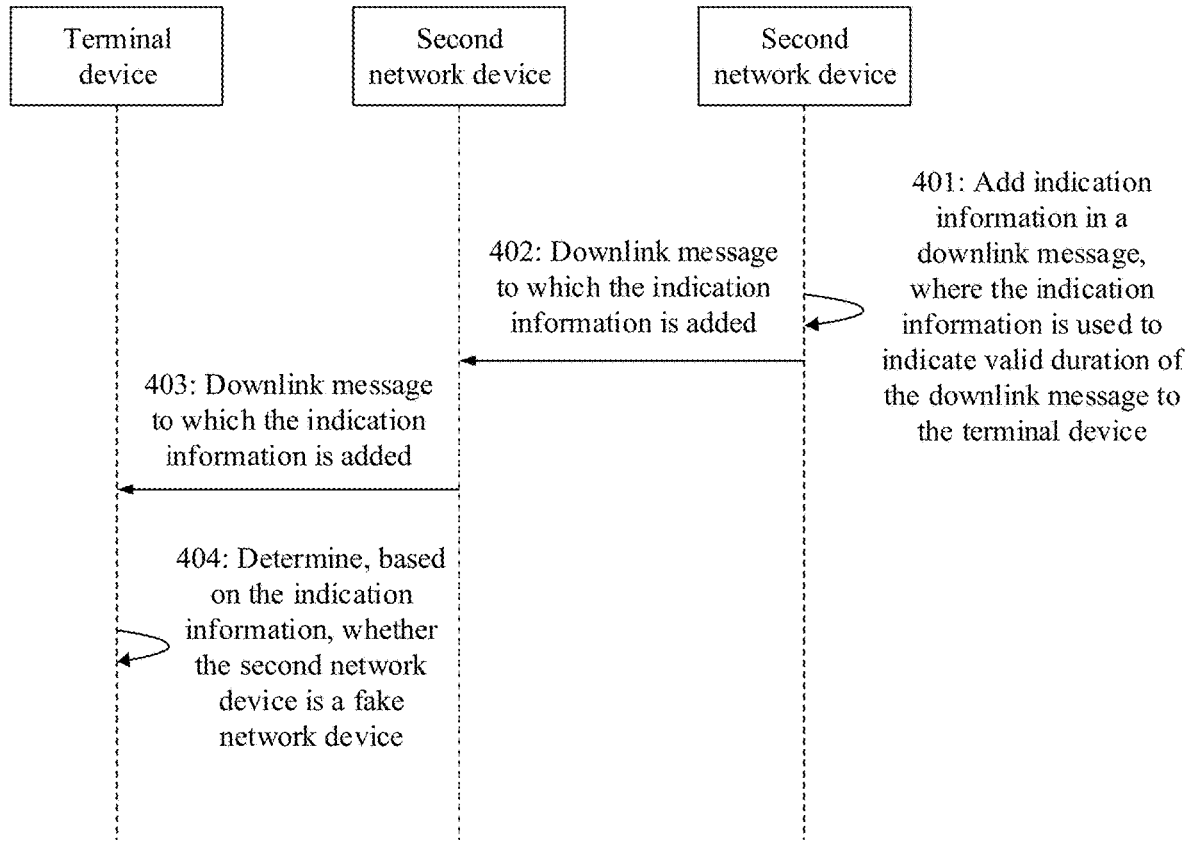
FIG. 6 is a flowchart of an example fake network device identification method according to an embodiment of this application.

FIG. 6 is a flowchart of an example fake network device identification method according to an embodiment of this application. In this embodiment, the fake network device identification method in this application is described from a perspective of interaction between a first network device and a terminal. This embodiment includes the following operations.

401: A first network device may add indication information in a downlink message, where the indication information is used to indicate valid duration of the downlink message to a terminal device.

In some embodiments, when sending the downlink message to the terminal device, the first network device adds the indication information to the downlink message, where the indication information is used to indicate the valid duration of the downlink message. In some embodiments, the valid duration indicates a time period in which the downlink message is valid, or indicates a time point before which the downlink message is valid.

402: The first network device may send, to a second network device, the downlink message to which the indication information is added.

In this operation for some embodiments, when the first network device sends, to the terminal device, the downlink message to which the indication information is added, the downlink message is intercepted by the second network device.

403: The second network device may send, to the terminal device, the downlink message to which the indication information is added.

404: The terminal device may determine, based on the indication information, whether the second network device is a fake network device.

In some embodiments, according to the fake network device identification method in this embodiment, when sending the downlink message to the terminal device, the first network device adds the indication information to the downlink message, to indicate the valid duration of the downlink message to the terminal device, so that the terminal device determines, based on the valid duration, whether there is a second network device involved. This may help to ensure communication security.

The following describes in detail how the terminal device identifies whether the second network device is a fake network device.

In some embodiments, after receiving the downlink message from the first network device, the terminal device determines, based on the indication information, whether the downlink message is valid. If the downlink message is valid, the terminal device may determine that the second network device is not a fake network device. If the downlink message is invalid, the terminal device may determines that the second network device is a fake network device.

For example, after receiving the downlink message, the terminal device parses the valid duration, and determines, based on the valid duration, whether the second network device is a fake network device. For example, if the valid duration indicates that the downlink message is valid in a time period, the terminal device determines whether a current time belongs to the time period; and if the current time belongs to the time period, the terminal device considers that the second network device is not a fake network device; if the current time does not belong to the time period, the terminal device considers that the second network device is a fake network device. For another example, if the valid duration indicates that the downlink message is valid before a time point, the terminal device determines whether a current time exceeds the time point; and if the current time exceeds the time point, the terminal device considers that the second network device is a fake network device; if the current time does not exceed the time point, the terminal device determines that the second network device is not a fake network device.

In this embodiment, when sending the downlink message to the terminal device, the first network device adds, to the downlink message, the indication information indicating the valid duration of the downlink message, so that the terminal device determines, based on the valid duration, whether the received downlink message is valid, and therefore identifies whether the second network device is a fake network device. This helps ensure the communication security.

In some embodiments, when the terminal device determines, based on the indication information, whether the second network device is a fake network device, the terminal device may determine, based on the indication information, whether the downlink message is valid; the terminal device records a quantity n of times of receiving an invalid downlink message; the terminal device determines whether the quantity n of times exceeds a preset quantity m of times; and if the quantity n of times exceeds the preset quantity m of times, the terminal device determines that the second network device is a fake network device, where m≥1 and m is an integer, and n≥1 and n is an integer.

For example, after receiving the downlink message carrying the indication information, if the terminal device determines, based on the indication information, that the downlink message is invalid, the invalid message may be caused by involvement of the second network device, or may be caused by another reason. In some embodiments, when receiving an invalid downlink message for the first time, if the terminal device determines that there is a second network device involved, misjudgment may occur. In some embodiments, to avoid misjudgment, each time after receiving an invalid downlink message, if the downlink message is invalid, the terminal device records a quantity n of times of receiving an invalid message. In some embodiments, whether the quantity n of times exceeds the preset quantity m of times is compared. If the quantity n of times exceeds the preset quantity m of times, it is considered that there is a second network device involved. If the quantity n of times does not exceed the preset quantity m of times, it is considered that there is no second network device involved. In some embodiments, the preset quantity m of times may indicate that the terminal device receives an invalid downlink message for m consecutive times, or may indicate that the terminal device receives an invalid downlink message for m accumulated times.

In this embodiment, the terminal device determines, based on the quantity of times of receiving an invalid downlink message, whether there is a second network device involved, to avoid misjudgment performed by the terminal device.

In some embodiments, a process in which a terminal device accesses a cell of a normal base station includes a synchronization phase, a broadcast message phase, and/or a random access phase. In some embodiments, when the first network device sends the broadcast message, the first network device does not need to be triggered by the uplink message. The following describes in detail how to identify that there is a second network device involved in a broadcast message phase.

In some embodiments, the downlink message includes a broadcast message, and that the terminal device receives the downlink message from the second network device includes: The terminal device receives, from the second network device, the broadcast message on which security processing is performed, where the first network device performs the security processing on the broadcast message and sends the broadcast message to the second network device; or the terminal device receives the broadcast message from the second network device, where the first network device performs security processing on indication information in the broadcast message.

For example, before sending the broadcast message to the terminal device, the first network device first adds the indication information to the broadcast message, and then sends, to the terminal device, the broadcast message to which the indication information is added. If there is a second network device, the broadcast information to which the indication information is added is forwarded by the second network device to the terminal device. In some embodiments, the terminal device receives the broadcast message. The terminal device may perform security processing on the entire broadcast message, or may perform security processing only on the indication information in the broadcast message. This is not limited in this embodiment of this application.

In this embodiment, the first network device adds the indication information to the broadcast message, so that after receiving the indication information, the terminal device may determine, based on the indication information, whether there is a network device currently involved. This helps identify a fake network device in the broadcast message phase.

It should be noted that, in the foregoing embodiment, the terminal device needs to keep synchronous with the first network device. In consideration of clock drift, the terminal device needs to maintain a timer. Each time when the timer expires, the terminal device initiates random access to synchronize with a clock in the first network device or a clock in a core network.

Figure 7:
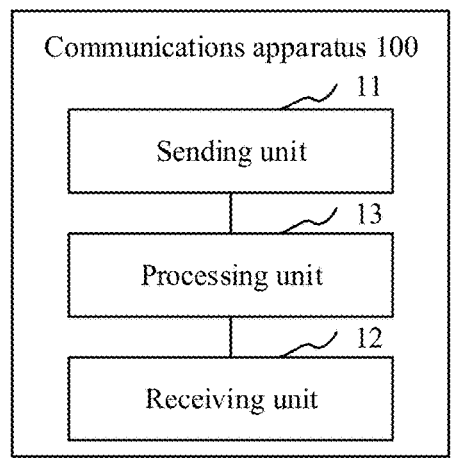
FIG. 7 is a schematic structural diagram of an example communications apparatus according to an embodiment of this application.

FIG. 7 is a schematic structural diagram of an example communications apparatus according to an embodiment of this application. The communications apparatus in this embodiment may be a terminal device, or may be a chip used in a terminal device. The communications apparatus may be configured to perform a function of the terminal device in FIG. 2 or an optional embodiment. As shown in FIG. 7, the communications apparatus 100 may include a sending unit 11, a receiving unit 12, and a processing unit 13.

The sending unit 11 is configured to send an uplink message to a second network device, where the uplink message is to be sent by the second network device to a first network device.

The receiving unit 12 is configured to receive a downlink message from the second network device, where the downlink message is received by the second network device from the first network device, and the downlink message is a message that is generated by the first network device based on the uplink message and on which security processing is performed based on first time information, where the security processing includes at least one of encryption or integrity protection, and the first time information is time information determined by the first network device based on a time point at which the uplink message is received.

The processing unit 13 is configured to perform security verification on the downlink message, where the security verification includes at least one of decryption or integrity protection verification.

In some embodiments, the processing unit 13 is configured to perform the security verification on the downlink message based on second time information, where the second time information is time information determined by the terminal device based on a time point at which the uplink message is sent; and when the security verification performed by the processing unit 13 on the downlink message fails, the processing unit 13 determines that the second network device is a fake network device.

In some embodiments, after the receiving unit 12 receives the downlink message from the second network device, the processing unit 13 is configured to: perform the security verification on the downlink message based on second time information, where the second time information is time information determined by the terminal device based on a time point at which the uplink message is sent; record a quantity n of times that verification performed on a downlink message fails; determine whether the quantity n of times exceeds a preset quantity m of times; and if the quantity n of times exceeds the preset quantity m of times, determine that the second network device is a fake network device, where m≥1 and m is an integer, and n≥1 and n is an integer.

In some embodiments, when the first network device performs security processing on the downlink message by using a first key, the processing unit 13 is configured to perform security verification on the downlink message by using a second key.

In some embodiments, the uplink message includes a random access message 1, and the downlink message includes a random access message 2.

In some embodiments, before the sending unit 11 sends the uplink message to the second network device, the receiving unit 12 is configured to receive a broadcast message from the first network device, where the broadcast message is a message on which the first network device performs security processing, and the broadcast message includes at least one of random access channel RACH resource configuration information or a system frame number SFN.

In some embodiments, the processing unit 13 is configured to determine a first RACH resource based on the RACH resource configuration information, where the RACH resource configuration information indicates the first RACH resource, and the first RACH resource is used by the terminal device to send the uplink message; and/or the sending unit 11 is configured to send the message 1 to the second network device on the first RACH resource.

In some embodiments, the uplink message includes a message 3 in a random access procedure, and the downlink message includes a message 4 in the random access procedure.

The communications apparatus provided in this embodiment of this application may perform an action of the terminal device in FIG. 2 and the optional embodiment. An implementation principle and a technical effect of the communications apparatus are similar to those of the terminal device. Details are not described herein again.

Figure 8:
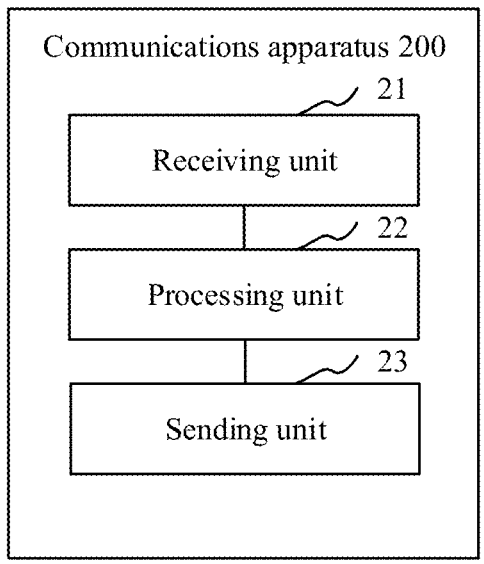
FIG. 8 is a schematic structural diagram of an example another communications apparatus according to an embodiment of this application.

FIG. 8 is a schematic structural diagram of an example communications apparatus according to an embodiment of this application. The communications apparatus in this embodiment may be a first network device, or may be a chip used in a first network device. The communications apparatus may be configured to perform a function of the first network device in FIG. 2 or an optional embodiment. As shown in FIG. 8, the communications apparatus 200 may include: a receiving unit 21, configured to receive an uplink message from a second network device, where the uplink message is sent by a terminal device to the second network device; a processing unit 22, configured to: generate a downlink message for the uplink message, and perform security processing on the downlink message based on first time information, where the security processing includes at least one of encryption or integrity protection, and the first time information is time information determined by the first network device based on a time point at which the uplink message is received; and/or a sending unit 23, configured to send the downlink message to the second network device, where the downlink message is to be sent by the second network device to the terminal device.

In some embodiments, before the sending unit 23 sends, to the second network device, the downlink message on which the security processing is performed, the processing unit 22 is configured to perform security processing on the downlink message by using a first key.

In some embodiments, the uplink message includes a message 1 in a random access procedure, and the downlink message includes a message 2 in the random access procedure.

In some embodiments, before the receiving unit 21 receives the uplink message from the second network device, the sending unit 23 is configured to send, to the terminal device, a broadcast message on which security processing is performed, where the broadcast message on which the security processing is performed includes at least one of random access channel RACH resource configuration information or a system frame number SFN.

In some embodiments, the receiving unit 21 is specifically configured to receive the message 1 from the second network device on a first RACH resource, where the message 2 does not carry an uplink grant, the RACH resource configuration information indicates the first RACH resource, and the first RACH resource is a resource used by the terminal device to send the uplink message.

In some embodiments, the uplink message includes a message 3 in a random access procedure, and the downlink message includes a message 4 in the random access procedure.

The communications apparatus provided in this embodiment of this application may perform an action of the first network device in FIG. 2 and the optional embodiment. An implementation principle and a technical effect of the communications apparatus are similar to those of the first network device. Details are not described herein again.

Figure 9:
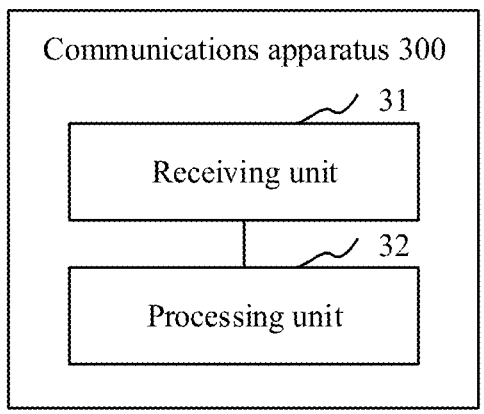
FIG. 9 is a schematic structural diagram of an example communications apparatus according to an embodiment of this application.

FIG. 9 is a schematic structural diagram of an example communications apparatus according to an embodiment of this application. The communications apparatus in this embodiment may be a terminal device, or may be a chip used in a terminal device. The communications apparatus may be configured to perform a function of the terminal device in FIG. 6 or an optional embodiment. As shown in FIG. 9, the communications apparatus 300 may include: a receiving unit 31, configured to receive a downlink message from a second network device, where the downlink message is sent by a first network device to the second network device, the downlink message carries indication information, and the indication information is used to indicate valid duration of the downlink message to the terminal device; and/or a processing unit 32, configured to determine, based on the indication information, whether the second network device is a fake network device.

In some embodiments, the processing unit 32 is configured to: determine, based on the indication information, whether the downlink message is valid; and if the downlink message is valid, determine that the second network device is a fake network device.

In some embodiments, the processing unit 32 is configured to: determine, based on the indication information, whether the downlink message is valid; record a quantity n of times of receiving an invalid downlink message; determine whether the quantity n of times exceeds a preset quantity m of times; and if the quantity n of times exceeds the preset quantity m of times, determine that the second network device is a fake network device, where m≥1 and m is an integer, and n≥1 and n is an integer.

In some embodiments, the downlink message includes a broadcast message; and/or the receiving unit 31 is configured to receive, from the second network device, the broadcast message on which security processing is performed, where the first network device performs the security processing on the broadcast message and sends the broadcast message to the second network device; or the receiving unit 31 is configured to receive the broadcast message from the second network device, where the broadcast message includes indication information on which security processing is performed, and the first network device performs the security processing on the indication information in the broadcast message.

The communications apparatus provided in this embodiment of this application may perform an action of the terminal device in FIG. 6 and the optional embodiment. An implementation principle and a technical effect of the communications apparatus are similar to those of the terminal device. Details are not described herein again.

Figure 10:
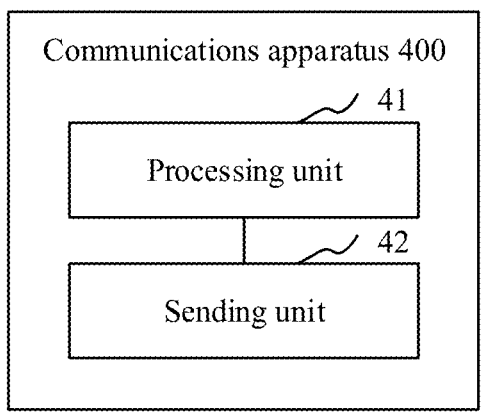
FIG. 10 is a schematic structural diagram of an example communications apparatus according to an embodiment of this application.

FIG. 10 is a schematic structural diagram of an example communications apparatus according to an embodiment of this application. The communications apparatus in this embodiment may be a first network device, or may be a chip used in a first network device. The communications apparatus may be configured to perform a function of the first network device in FIG. 6 or an optional embodiment. As shown in FIG. 10, the communications apparatus 400 may include: a processing unit 41, configured to add indication information in a downlink message, where the indication information is used to indicate valid duration of the downlink message to a terminal device; and/or a sending unit 42, configured to send the downlink message to a second network device, where the downlink message is to be sent by the second network device to the terminal device.

In some embodiments, the downlink message includes a broadcast message; and/or the processing unit 41 is configured to perform security processing on the broadcast message, and the sending unit 42 is configured to send, to the second network device, the broadcast message on which the security processing is performed; or the processing unit 41 is configured to perform security processing on indication information, and the sending unit 42 is configured to send, to the second network device, the broadcast message including the indication information on which the security processing is performed.

The communications apparatus provided in this embodiment of this application may perform an action of the first network device in FIG. 6 and the optional embodiment. An implementation principle and a technical effect of the communications apparatus are similar to those of the first network device. Details are not described herein again.

It should be noted that, it should be understood that the receiving unit may be a receiver during actual implementation, and the sending unit may be a transmitter during actual implementation. The processing unit may be implemented in a form of software invoked by a processing element, or may be implemented in a form of hardware. For example, the processing unit may be a separately disposed processing element, or may be integrated into a chip of the foregoing apparatus for implementation. In some embodiments, the processing unit may be stored in a memory of the foregoing apparatus in a form of program code, and is invoked by a processing element of the foregoing apparatus to perform a function of the processing unit. In some embodiments, all or some of the units may be integrated together, or may be implemented independently. The processing element described herein may be an integrated circuit with a signal processing capability. In an implementation process, operations of the foregoing method or the foregoing units may be implemented by using an integrated logical circuit of hardware in the processor element, or by using an instruction in a form of software.

For example, the foregoing units may be configured as one or more integrated circuits for implementing the foregoing method, such as one or more application-specific integrated circuits (application specific integrated circuit, ASIC), one or more microprocessors (digital signal processor, DSP), or one or more field programmable gate arrays (field programmable gate array, FPGA). For another example, when a unit is implemented by scheduling program code by a processing element, the processing element may be a general-purpose processor, for example, a central processing unit (central processing unit, CPU) or another processor that can invoke the program code. For another example, the units may be integrated and implemented in a form of a system-on-a-chip (system-on-a-chip, SOC).

Figure 11:
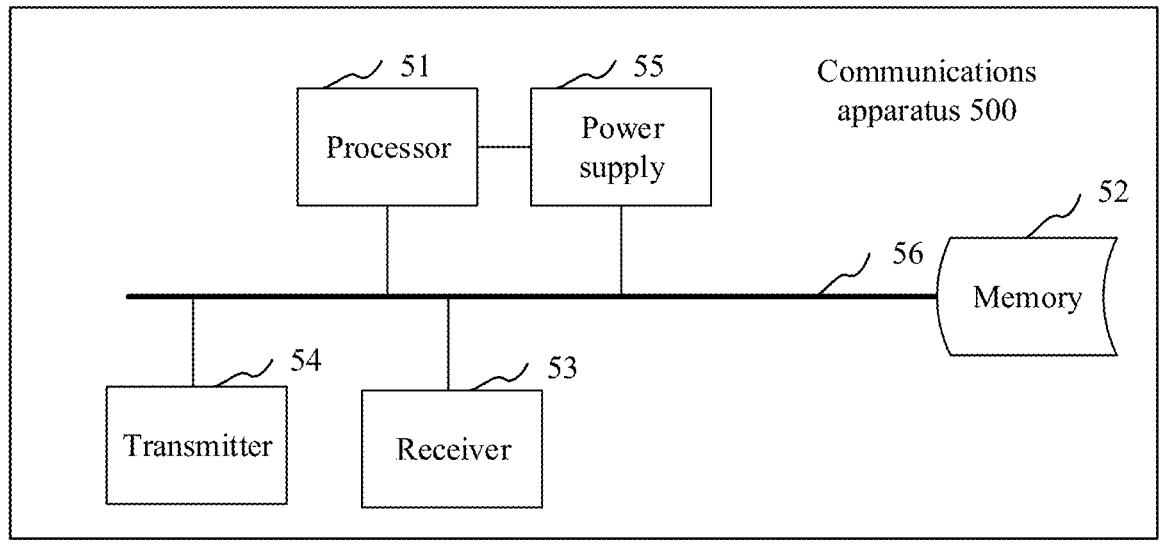
FIG. 11 is a schematic structural diagram of an example communications apparatus according to an embodiment of this application.

FIG. 11 is a schematic structural diagram of an example communications apparatus according to an embodiment of this application. As shown in FIG. 11, the communications apparatus 500 may include a processor 51 (for example, a CPU), a memory 52, a receiver 53, and a transmitter 54. Both the receiver 53 and the transmitter 54 are coupled to the processor 51, and the processor 51 controls a receiving action of the receiver 53 and a sending action of the transmitter 54. The memory 52 may include a high-speed random-access memory (random-access memory, RAM), and may include a non-volatile memory (non-volatile memory, NVM), for example, at least one magnetic disk storage. The memory 52 may store various instructions, to complete various processing functions and implement method operations in this application. In some embodiments, the communications apparatus in this application may include a power supply 55 and a communications bus 56. The receiver 53 and the transmitter 54 may be integrated into a transceiver of the communications apparatus, or may be independent transceiver antennas on the communications apparatus. The communications bus 56 is configured to implement a communication connection between elements.

In this embodiment of this application, the memory 52 is configured to store computer-executable program code, and the program code includes an instruction. When the processor 51 executes the instruction, the processor 51 of the communications apparatus is enabled to perform a processing action of the terminal device in the foregoing method embodiment, the receiver 53 is enabled to perform a receiving action of the terminal device in the foregoing method embodiment, and the transmitter 54 is enabled to perform a sending action of the terminal device in the foregoing method embodiment. An implementation principle and a technical effect in this embodiment are similar to those of the method embodiment, and details are not described herein again.

Figure 12:
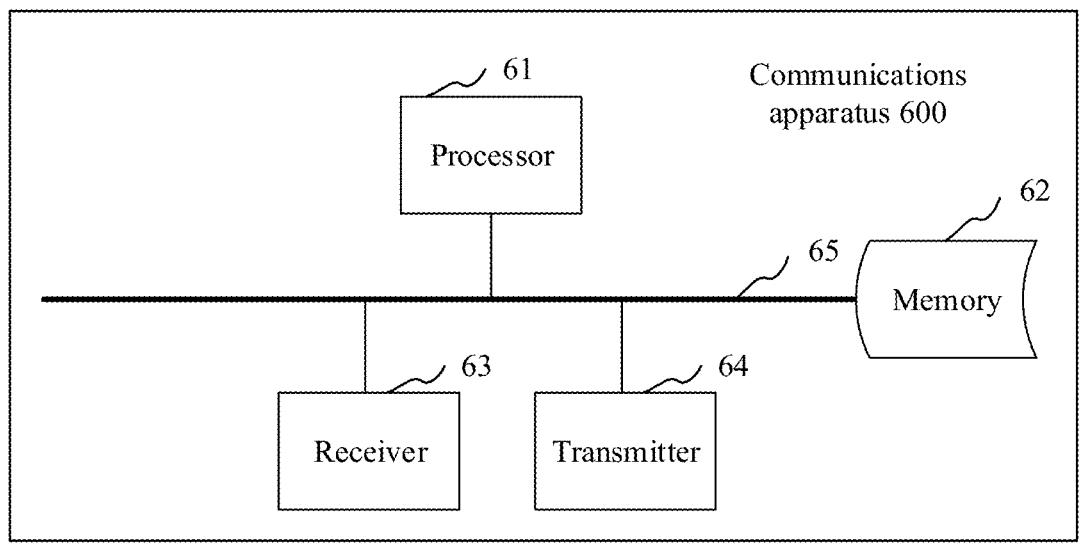
FIG. 12 is a schematic structural diagram of an example communications apparatus according to an embodiment of this application.

FIG. 12 is a schematic structural diagram of an example communications apparatus according to an embodiment of this application. As shown in FIG. 12, the communications apparatus 600 may include a processor 61 (for example, a CPU), a memory 62, a receiver 63, and a transmitter 64. Both the receiver 63 and the transmitter 64 are coupled to the processor 61, and the processor 61 controls a receiving action of the receiver 63 and a sending action of the transmitter 64. The memory 62 may include a high-speed random-access memory (random-access memory, RAM), and may include a non-volatile memory (non-volatile memory, NVM), for example, at least one magnetic disk storage. The memory 62 may store various instructions, to complete various processing functions and implement method operations in this application. In some embodiments, the communications apparatus in this application may include a communications bus 65. The receiver 63 and the transmitter 64 may be integrated into a transceiver of the communications apparatus, or may be independent transceiver antennas on the communications apparatus. The communications bus 65 is configured to implement a communication connection between elements.

In this embodiment of this application, the memory 62 is configured to store computer-executable program code, and the program code includes an instruction. When the processor 61 executes the instruction, the processor 61 of the communications apparatus is enabled to perform a processing action of the first network device in the foregoing method embodiment, the receiver 63 is enabled to perform a receiving action of the first network device in the foregoing embodiment, and the transmitter 64 is enabled to perform a sending action of the first network device in the foregoing method embodiment. An implementation principle and a technical effect in this embodiment are similar to those of the method embodiment, and details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded or executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The term "a plurality of" in this specification refers to two or more than two. The term "and/or" in this specification describes only an association relationship for describing associated objects and represents that three relationships may exist. For example, A and/or B may represent the following three cases: Only A exists, both A and B exist, and only B exists. In some embodiments, the description manner "at least one of" in this specification indicates one or any combination of the listed items. For example, "at least one of A, B, and C" may represent the following seven cases: Only A exists, only B exists, only C exists, both A and B exist, both B and C exist, both A and C exist, and A, B, and C exist. In some embodiments, the character "/" in this specification usually indicates an "or" relationship between associated objects. In a formula, the character "/" indicates a "division" relationship between associated objects.

It may be understood that numerical symbols in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. An information security processing method, comprising:
    sending, by a terminal device, an uplink message to a second network device;
    receiving, by the terminal device, a downlink message from the second network device, the downlink message is a message that is generated by a first network device based on the uplink message and on which security processing is performed by the first network device based on first time information, wherein the security processing comprises at least one of encryption or integrity protection, the first time information is determined by the first network device based on a time point at which the uplink message is received at the first network device;
    deducing, by the terminal device, second time information based on a time point at which the uplink message was sent by the terminal device; and
    performing, by the terminal device, security verification on the downlink message based on the first time information and the second time information, wherein the security verification comprises at least one of decryption or integrity protection verification of the downlink message.

2. The method of claim 1, further comprising:
    when the security verification performed by the terminal device on the downlink message fails, determining, by the terminal device, that the second network device is a fake network device.

3. The method of claim 1, wherein the uplink message comprises a message 1 in a random access procedure, and the downlink message comprises a message 2 in the random access procedure.

4. The method of claim 1, wherein before the sending, by the terminal device, the uplink message to the second network device, the method further comprises:
    receiving, by the terminal device, a broadcast message from the first network device, wherein the broadcast message is a message on which the first network device performs security processing, and the broadcast message comprises at least one of random access channel (RACH) resource configuration information or a system frame number SFN.

5. The method of claim 1, wherein the uplink message comprises a message 3 in a random access procedure, and the downlink message comprises a message 4 in the random access procedure.

6. An information security processing method, comprising:
    receiving, by a first network device, an uplink message from a second network device, wherein the uplink message is sent by a terminal device to the second network device; and
    sending, by the first network device, a downlink message to the second network device, the downlink message is generated by the first network device for the uplink message, and the first network device performs security processing on the downlink message based on first time information determined by the first network device according to a time point at which the uplink message is received at the first network device, wherein the security processing comprises at least one of encryption or integrity protection, and wherein the terminal device performs security verification based on comparing the first time information with second time information, the second time information deduced by the terminal device based on a time point at which the uplink message was previously sent by the terminal device.

7. The method of claim 6, wherein
    before the sending, by the first network device to the second network device, the downlink message on which security processing is performed, the method further comprises:
    performing, by the first network device, the security processing on the downlink message by using a first key.

8. The method of claim 6, wherein the uplink message comprises a message 1 in a random access procedure, and the downlink message comprises a message 2 in the random access procedure.

9. The method of claim 6, wherein before the receiving, by the first network device, the uplink message from the second network device, the method further comprises:
    sending, by the first network device to the terminal device, a broadcast message on which security processing is performed, wherein the broadcast message on which the security processing is performed comprises at least one of random access channel (RACH) resource configuration information or a system frame number (SFN).

10. The method of claim 6, wherein the uplink message comprises a message 3 in a random access procedure, and the downlink message comprises a message 4 in the random access procedure.

11. A communications apparatus, comprising:
    a transmitter, configured to send an uplink message to a second network device;
    a receiver, configured to receive a downlink message from the second network device, the downlink message is a message that is generated by a first network device based on the uplink message and on which security processing is performed by the first network device based on first time information, wherein the security processing comprises at least one of encryption or integrity protection, the first time information is determined by the first network device based on a time point at which the uplink message is received at the first network device; and a processor, configured to deduce second time information based on a time point at which the uplink message was sent and perform security verification on the downlink message based on the first time information and the second time information, wherein the security verification comprises at least one of decryption or integrity protection verification of the downlink message.

12. The apparatus of claim 11, wherein
when the security verification performed by the processor on the downlink message fails, the processor determines that the second network device is a fake network device.

13. The apparatus of claim 11, wherein the uplink message comprises a random access message 1, and the downlink message comprises a random access message 2.

14. The apparatus of claim 11, wherein
before the transmitter sends the uplink message to the second network device, the receiver is configured to receive a broadcast message from the first network device, wherein the broadcast message is a message on which the first network device performs the security processing, and the broadcast message comprises at least one of random access channel (RACH) resource configuration information or a system frame number (SFN).

15. The apparatus of claim 11, wherein the uplink message comprises a message 3 in a random access procedure, and the downlink message comprises a message 4 in the random access procedure.

16. A communications apparatus, comprising:
a receiver, configured to receive an uplink message from a second network device, wherein the uplink message is sent by a terminal device to the second network device;

a processor, configured to: generate a downlink message for the uplink message, and perform security processing on the downlink message based on first time information determined according to a time point at which the uplink message is received, wherein the security processing comprises at least one of encryption or integrity protection, and wherein the terminal device performs security verification based on comparing the first time information with second time information, the second time information deduced by the terminal device based on a time point at which the uplink message was previously sent by the terminal device; and a transmitter, configured to send the downlink message to the second network device.

17. The apparatus of claim 16, wherein
before the transmitter sends, to the second network device, the downlink message on which the security processing is performed, the processor is further configured to perform the security processing on the downlink message by using a first key.

18. The apparatus of claim 16, wherein the uplink message comprises a message 1 in a random access procedure, and the downlink message comprises a message 2 in the random access procedure.

19. The apparatus of claim 16, wherein
before the receiver receives the uplink message from the second network device, the transmitter is further configured to send, to the terminal device, a broadcast message on which the security processing is performed, wherein the broadcast message on which the security processing is performed comprises at least one of random access channel (RACH) resource configuration information or a system frame number (SFN).

20. The apparatus of claim 16, wherein the uplink message comprises a message 3 in a random access procedure, and the downlink message comprises a message 4 in the random access procedure.

* * * * *